US012645933B2

(12) United States Patent
Wang et al.

(10) Patent No.: US 12,645,933 B2
(45) Date of Patent: Jun. 2, 2026

(54) METHOD AND SYSTEM FOR TRAINING A NEURAL NETWORK FOR GENERATING UNIVERSAL ADVERSARIAL PERTURBATIONS

(71) Applicant: Mitsubishi Electric Research Laboratories, Inc., Cambridge, MA (US)

(72) Inventors: Ye Wang, Andover, MA (US); Shuchin Aeron, Newton, MA (US); Adnan Rakin, Tempe, AZ (US); Toshiaki Koike Akino, Belmont, MA (US); Pierre Moulin, Urbana, IL (US); Kieran Parsons, Rockport, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 993 days.

(21) Appl. No.: 17/450,476

(22) Filed: Oct. 11, 2021

(65) Prior Publication Data

US 2023/0109964 A1 Apr. 13, 2023

(51) Int. Cl.
*G06N 3/08* (2023.01)
*G06F 18/10* (2023.01)
(Continued)

(52) U.S. Cl.
CPC .............. *G06N 3/08* (2013.01); *G06F 18/10* (2023.01); *G06N 3/047* (2023.01); *G06N 3/094* (2023.01); *G06V 40/00* (2022.01); *G07C 9/37* (2020.01)

(58) Field of Classification Search
CPC ...... G06N 3/047; G06N 3/094; G06N 3/0895; G06N 3/084; G06N 3/045; G06N 3/0475; G06F 18/10
See application file for complete search history.

(56) References Cited

U.S. PATENT DOCUMENTS

2019/0188402 A1* 6/2019 Wang ........................ G06N 7/01
2022/0138565 A1* 5/2022 Li ............................ G06N 3/08
706/25
2022/0253714 A1* 8/2022 Chen ...................... G06N 3/088

OTHER PUBLICATIONS

University of New Mexico, "Conditional Entropy", accessible Sep. 20, 2006 (Year: 2006).*

(Continued)

*Primary Examiner* — Jennifer N Welch
*Assistant Examiner* — Vijay M Balakrishnan
(74) *Attorney, Agent, or Firm* — Gene Vinokur

(57) ABSTRACT

Embodiments of the present disclosure disclose a method and a system for training a neural network for generating universal adversarial perturbations. The method includes collecting a plurality of data samples. Each of the plurality of data samples is identified by a label from a finite set of labels. The method includes training a probabilistic neural network for transforming the plurality of data samples into a corresponding plurality of perturbed data samples having a bounded probability of deviation from the plurality of data samples by maximizing a conditional entropy of the finite set of labels of the plurality of data samples conditioned on the plurality of perturbed data samples. The conditional entropy is unknown. The probabilistic neural network is trained based on an iterative estimation of a gradient of the unknown conditional entropy of labels. The method further includes generating the universal adversarial perturbations based on the trained probabilistic neural network.

16 Claims, 14 Drawing Sheets

400A

(51) Int. Cl.
| | |
|---|---|
| *G06N 3/047* | (2023.01) |
| *G06N 3/094* | (2023.01) |
| *G06V 40/00* | (2022.01) |
| *G07C 9/37* | (2020.01) |

(56) References Cited

OTHER PUBLICATIONS

Bugli et al., "Comparison between Principal Component Analysis and Independent Component Analysis in Electroencephalograms Modelling", published Mar. 29, 2007 (Year: 2007).*

Banaee et al., "Data Mining for Wearable Sensors in Health Monitoring Systems: A Review of Recent Trends and Challenges" published Dec. 17, 2013 (Year: 2013).*

Li et al., Gradient Estimator for Implicit Models, published May 26, 2018 (Year: 2018).*

Tripathy et al., "Privacy-Preserving Adversarial Networks", published Jun. 12, 2019 (Year: 2019).*

Khan Academy, "Lagrange multipliers, introduction", accessible Aug. 7, 2020 (Year: 2020).*

Malekzadeh et al., "Privacy and utility preserving sensor-data transformations", published Mar. 2020 (Year: 2020).*

Sariyildiz et al., "Gradient Matching Generative Networks for Zero-Shot Learning", published Jan. 9, 2020 (Year: 2020).*

Schellenberger et al., "A dataset of clinically recorded radar vital signs with synchronized reference sensor signals", published Sep. 8, 2020 (Year: 2020).*

Taboga, "Score vector", accessible Jun. 4, 2021 (Year: 2021).*

Mir, Darakhshan J.. "Information—Theoretic Foundations of Differential Privacy", 2012, Foundations and Practice of Security (Year: 2012).*

Moosavi-Deszfooli et al., "Universal adversarial perturbations", 2017, 2017 IEEE Conference on Computer Vision and Pattern Recognition, 9 pages (Year: 2017).*

Wu et al., "Towards Privacy-Preserving Visual Recognition via Adversarial Training: A Pilot Study", Sep. 9, 2018, Computer Vision—ECCV 2018: 15th European Conference, Munich, Germany, Sep. 8-14, 2018, Proceedings, Part XVI, 19 pages (Year: 2018).*

Zhang et al., "Adversarial Privacy-preserving Filter", Oct. 12, 2020, MM '20: Proceedings of the 28th ACM International Conference on Multimedia, 9 pages (Year: 2020).*

Chaubey et al., "Universal Adversarial Perturbations: A Survey", May 16, 2020, arXiv:2005.08087v1, 20 pages (Year: 2020).*

Wen, L., "Mutual Information Gradient Estimation for Representation Learning", May 3, 2020, arXiv:2005.01123v1, 14 pages (Year: 2020).*

* cited by examiner

DATA COLLECTION 202

PROBABILISTIC NEURAL NETWORK TRAINING 204

ITERATE THE TRAINING UNTIL TERMINATION CONDITION IS MET 206

GENERATION OF UNIVERSAL ADVERSARIAL PERTURBATION 208

200

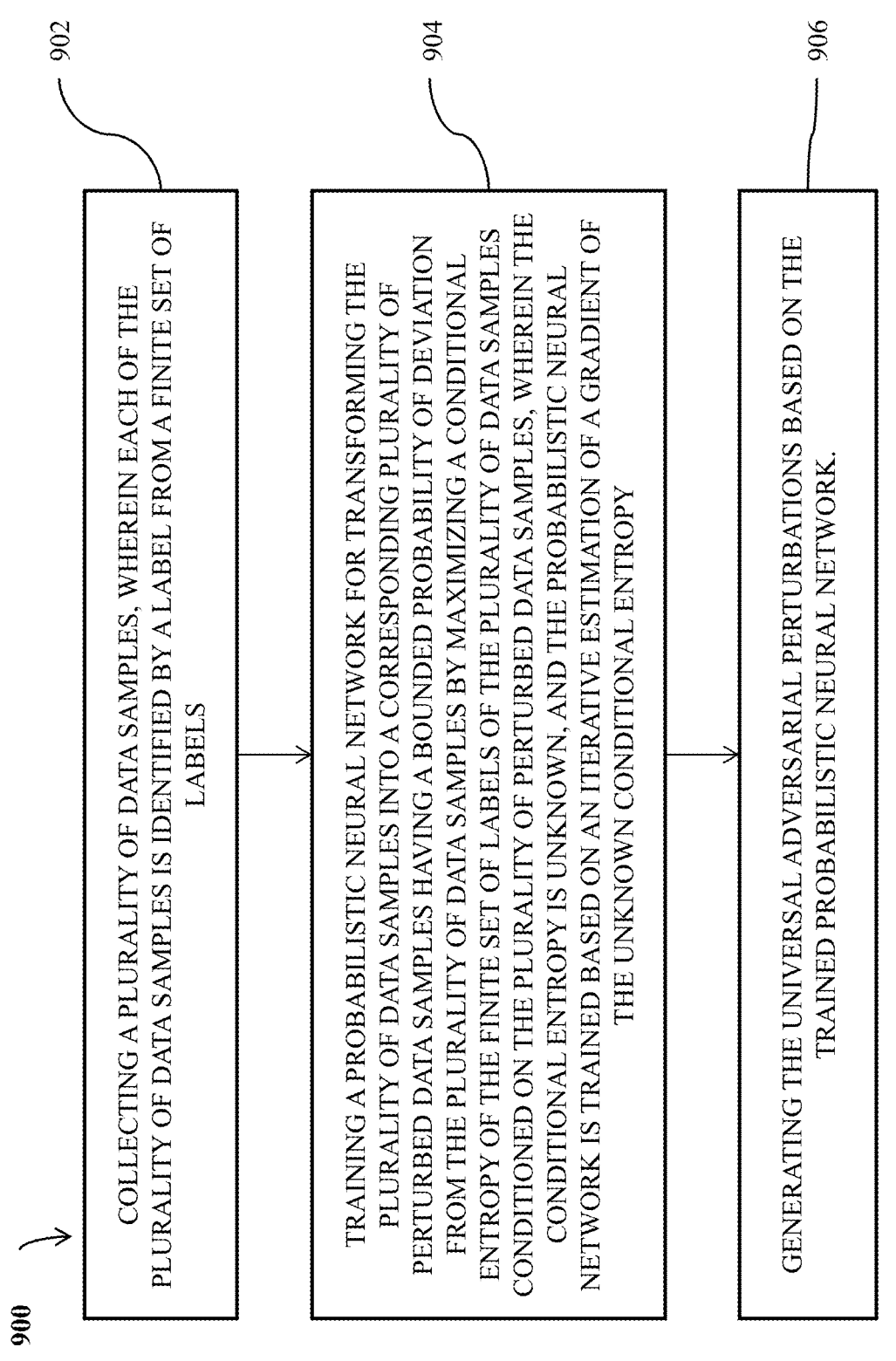

900

902

COLLECTING A PLURALITY OF DATA SAMPLES, WHEREIN EACH OF THE PLURALITY OF DATA SAMPLES IS IDENTIFIED BY A LABEL FROM A FINITE SET OF LABELS

904

TRAINING A PROBABILISTIC NEURAL NETWORK FOR TRANSFORMING THE PLURALITY OF DATA SAMPLES INTO A CORRESPONDING PLURALITY OF PERTURBED DATA SAMPLES HAVING A BOUNDED PROBABILITY OF DEVIATION FROM THE PLURALITY OF DATA SAMPLES BY MAXIMIZING A CONDITIONAL ENTROPY OF THE FINITE SET OF LABELS OF THE PLURALITY OF DATA SAMPLES CONDITIONED ON THE PLURALITY OF PERTURBED DATA SAMPLES, WHEREIN THE CONDITIONAL ENTROPY IS UNKNOWN, AND THE PROBABILISTIC NEURAL NETWORK IS TRAINED BASED ON AN ITERATIVE ESTIMATION OF A GRADIENT OF THE UNKNOWN CONDITIONAL ENTROPY

906

GENERATING THE UNIVERSAL ADVERSARIAL PERTURBATIONS BASED ON THE TRAINED PROBABILISTIC NEURAL NETWORK.

FIG. 9

METHOD AND SYSTEM FOR TRAINING A NEURAL NETWORK FOR GENERATING UNIVERSAL ADVERSARIAL PERTURBATIONS

TECHNICAL FIELD

The present disclosure relates generally to adversarial data perturbations, and more specifically to a method and system for training a neural network for generating universal adversarial perturbations.

BACKGROUND

In recent advances, machine learning and deep neural networks have been widely used for classification of data. However, machine learning models are often vulnerable to attacks based on adversarial manipulation of the data. The adversarial manipulation of the data is known as an adversarial example. The adversarial example is a sample of the data that is intentionally modified with small feature perturbations. These feature perturbations are intended to cause a machine learning or deep neural network (ML/DNN) model to output an incorrect prediction. In particular, the feature perturbations are imperceptible noise to the data causing an ML classifier to misclassify the data. Such adversarial example is be used to perform an attack on ML systems, which poses security concerns. The adversarial example poses potential security threats for ML applications, such as robots perceiving world through cameras and other sensors, video surveillance systems, and mobile applications for image or sound classification. The attack on such ML systems requires parameters, i.e., target model information, such as, weights, gradients, model inquiry, architecture, or the like. The target model information is required for improving efficiency of the adversarial attack.

The adversarial attack includes a black-box adversarial attack, a white box adversarial attack, or the like. The white-box adversarial attack relies on the target model information of the ML/DNN model, while the black box adversarial attack may or may not rely on such target model information to generate adversarial perturbations. The black-box adversarial attack uses queries to extract information, such as, a decision rule to generate improved adversarial perturbations. However, the use of queries entails additional memory, computational overhead, or online access to send multiple query requests for the extraction of decision rule information. The black-box and white-box adversarial attacks also require adjusting the adversarial perturbations depending on the target ML/DNN model, which are computationally expensive.

Accordingly, there is a need to overcome the above-mentioned problem. More specifically, there is need to develop a method and system for generating universal adversarial perturbations, independent of a target ML/DNN model information.

SUMMARY

The adversarial example attack is broadly categorized into two classes of threat models, such as a white-box adversarial attack and a black-box attack. In the white-box adversarial attack, an attacker accesses parameters of a target model. For instance, the attacker access of the parameters, such as architecture, weights, gradients, or the like of the target model. The white-box adversarial attack requires strong adversarial access to conduct a successful attack, which is infeasible. Additionally, such white-box adversarial attack suffers higher computational overhead, for example, time and attack iterations. In contrast, the black-box adversarial attack, the adversarial access of the parameters of the target model is limited. For example, the adversarial access only includes accessing example input data and output data pairs for the target model. Alternatively, in the black-box adversarial attack, any information of the target model is not be used. In such adversarial attack, a substitute or a source model is trained with a training data to generate an adversarial perturbation. The generated adversarial perturbation is added to the input data to attack a target black-box DNN. For example, an input image is inputted to the substitute model to generate an adversarial perturbation. The adversarial perturbation is then added to the input image to attack the target black-box DNN. In some cases, a model query is used to obtain information from the target black-box DNN. Such model query improves efficacy of the black-box or white-box adversarial attack. Thus, the black-box or the white-box adversarial attack is avoided when there is no knowledge of the target DNN and no access to any model query.

To that end, it is an objective of the present disclosure to generate universal adversarial perturbations that include a set of adversarial examples independent of any target model information. The universal adversarial perturbations are generated by a probabilistic neural network that exploits a structure inherent to a statistical distribution of data. It is also an objective of the present disclosure to train the probabilistic neural network for generating the universal adversarial perturbations.

Some embodiments of the present disclosure are based on a realization that there is a fundamental connection between a robust machine learning model (e.g., a classifier) and privacy-preserving data processing mechanism (e.g., perturbation mechanism) problems under a game theoretic perspective. More specifically, a game between the classifier and perturbation mechanism has a saddle point, which is minimax point characterized by an information theoretic optimization problem that is leveraged to find the equilibrium strategies. To that end, the universal adversarial perturbations are a multi-objective perturbation used in solving the robust machine learning model and privacy-preserving data processing mechanism problems. For instance, the universal adversarial perturbations are used to augment an input data for training the robust machine learning model. The universal adversarial perturbations are used as privacy-preserving data processing mechanism, such as concealing sensitive information in the input data, while achieving an optimized privacy-utility tradeoff and preventing any adversarial attacks.

In some example embodiments, the probabilistic neural network is trained for transforming a plurality of data samples into a corresponding plurality of perturbed data samples. Each of the plurality of data samples is identified by a label from a finite set of labels. The plurality of perturbed data samples includes a bounded probability of deviation from the plurality of data samples. The bounded probability of deviation is obtained by maximizing a conditional entropy of the finite set of labels of the plurality of data samples conditioned on the plurality of perturbed data samples. The conditional entropy of the finite set of labels of the plurality of data samples conditioned on the plurality of perturbed data samples is unknown as statistical distributions of the plurality of data samples conditioned on the plurality of perturbed data samples are unknown and difficult to estimate.

To that end, the maximizing of the conditional entropy is represented as minimizing an unknown mutual information between the label and corresponding perturbed data sample for fixed entropies of the finite set of labels. In general, the mutual information of the label and perturbed data sample is a measure of mutual dependence between label and perturbed data sample. The measure of mutual dependence corresponds to an amount of information that is obtained for the label based on the perturbed data sample. In order to minimize the mutual information between the label and perturbed data sample, the probabilistic neural network is trained offline.

In some embodiments, the probabilistic neural network is trained based on an iterative estimation of a gradient of the unknown conditional entropy of the finite set of labels. The gradient of the unknown conditional entropy of the finite set of labels is estimated based on a mutual information gradient estimation method. In particular, the gradient of the unknown mutual information is decomposed as an entropy of the perturbed data sample without the conditional entropy of the perturbed data sample conditioned on the label. Further, the conditional entropy of the perturbed data sample conditioned on the label is decomposed as a summation of entropy of the perturbed data sample for each label of corresponding data sample weighted by a probability of each label.

In some embodiments, a gradient of the entropy of the perturbed data sample and the entropy of the perturbed data sample is estimated using a score function estimation method. The score function estimation method includes one or a combination of a Stein Gradient Estimator, a Spectral Stein Gradient Estimator, and a Kernel Exponential Family Estimator.

In some embodiments, an objective of the maximizing conditional entropy of the finite set of within the bounded probability of deviation is converted to a corresponding Lagrangian form. The conversion to the Lagrangian form yields a fixed-point characterization of an optimal solution for maximizing the conditional entropy. To that end, the training of the probabilistic neural network is performed by minimizing a gradient-matching loss function that satisfies the fixed-point characterization. The training of the probabilistic neural network is iterative until a termination condition is met.

Some embodiments of the present disclosure are based on the understanding that the trained probabilistic neural network is used to supplant or augment standard adversarial training methods for learning robust neural network models. For instance, a robust neural network model is trained by generating adversarial input data at each step of model training and updating the robust neural network model to minimize a loss function relative to the adversarial input data. However, the generation of the adversarial input data for each step of training is computationally expensive. To that end, the trained probabilistic neural network universal adversarial perturbation is used to train the robust neural network model. In particular, the universal adversarial perturbations generated by the trained probabilistic neural network are used to augment an input data. The augmented input data with the universal adversarial perturbations output a perturbed input data that are used to train the robust neural network model. The perturbed input data to train the robust neural network model avoids computational complexity and instability of alternating adversarial optimization. Further, the perturbed input data is classified using a trained classifier.

At an inference phase or an online application stage, the trained probabilistic neural network is used generate a set of adversarial examples without high computation cost. The set of adversarial examples is used for developing universal defense responses through an adversarial training, without depending on any specific machine learning or neural network model. Such set of adversarial examples is termed as universal adversarial perturbations.

In some embodiments, the universal adversarial perturbations include a multi-objective perturbation. In the multi-objective perturbation, different bounds for bounding the probability of deviation of the plurality of perturbed data samples are selected from the plurality of data samples based on an objective of the probabilistic neural network. The objective of the probabilistic neural network is to include a data-privacy objective and a robust learning objective. A bound for the data-privacy objective is greater than a bound for the robust learning objective.

To that end, the trained probabilistic neural network that generates the universal adversarial perturbations is used in an ML system operating in a physical world. The ML system uses a sensor, such as a camera, a motion sensor, or the like to collect a plurality of data samples. In some example embodiments, the plurality of data samples corresponds to a sensed data signal, such as vital signs of a subject. The sensor data signal includes one or more of vital signs of a subject. The sensed data signal is measured by the sensor based on a type of relative placement between the sensor and a source of the sensed data signal. The corresponding label of the finite set of labels specifies the type of the relative placement.

Accordingly, one embodiment discloses a computer-implemented method of training a neural network for generating universal adversarial perturbations. The method includes collecting a plurality of data samples. Each of the plurality of data samples is identified by a label from a finite set of labels. The method involves training a probabilistic neural network for transforming the plurality of data samples into a corresponding plurality of perturbed data samples having a bounded probability of deviation from the plurality of data samples by maximizing a conditional entropy of the finite set of labels of the plurality of data samples conditioned on the plurality of perturbed data samples. The conditional entropy is unknown, and the probabilistic neural network is trained based on an iterative estimation of a gradient of the unknown conditional entropy of labels. The method further includes generating the universal adversarial perturbations based on the trained probabilistic neural network.

Accordingly, another embodiment discloses a system for training a neural network for generating universal adversarial perturbations. The system includes a processor; and a memory having instructions stored thereon. The processor is configured to execute the stored instructions to cause the system to collect a plurality of data samples of a data signal, wherein each of the samples is identified by a label from a finite set of labels. The processor is configured to execute the stored instructions to cause the system to train a probabilistic neural network for transforming the plurality of data samples into a corresponding plurality of perturbed data samples having a bounded probability of deviation from the plurality of data samples by maximizing a conditional entropy of the finite set of labels of the plurality of data samples conditioned on the plurality of perturbed data samples. The conditional entropy of the finite set of labels is unknown, and the probabilistic neural network is trained based on an iterative estimation of a gradient of the unknown conditional entropy of labels. The processor is configured to execute the stored instructions to further cause the system to generate the universal adversarial perturbations based on the trained probabilistic neural network.

Accordingly, yet another embodiment discloses a universal adversarial perturbation system. The universal adversarial perturbation system includes a receiver, a processor, and a transmitter. The receiver is operatively connected to a sensor to receive a sensed data signal. The processor is configured to execute a probabilistic neural network trained for transforming a plurality of data samples corresponding to the sensed data signal into a plurality of perturbed data samples having a bounded probability of deviation from the plurality of data samples by maximizing a conditional entropy of the finite set of labels of the plurality of data samples conditioned on the plurality of perturbed data samples. The conditional entropy is unknown, and the probabilistic neural network is trained based on an iterative estimation of a gradient of the unknown conditional entropy. The transmitter is configured to transmit the plurality of perturbed data samples as a perturbed data signal over a wireless or a wired communication channel

BRIEF DESCRIPTION OF THE DRAWINGS

FIG. 9 shows a method flow diagram for training a neural network for generating universal adversarial perturbations, according to some embodiments of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example", "for instance", and "such as", and the verbs "comprising", "having", "including", and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
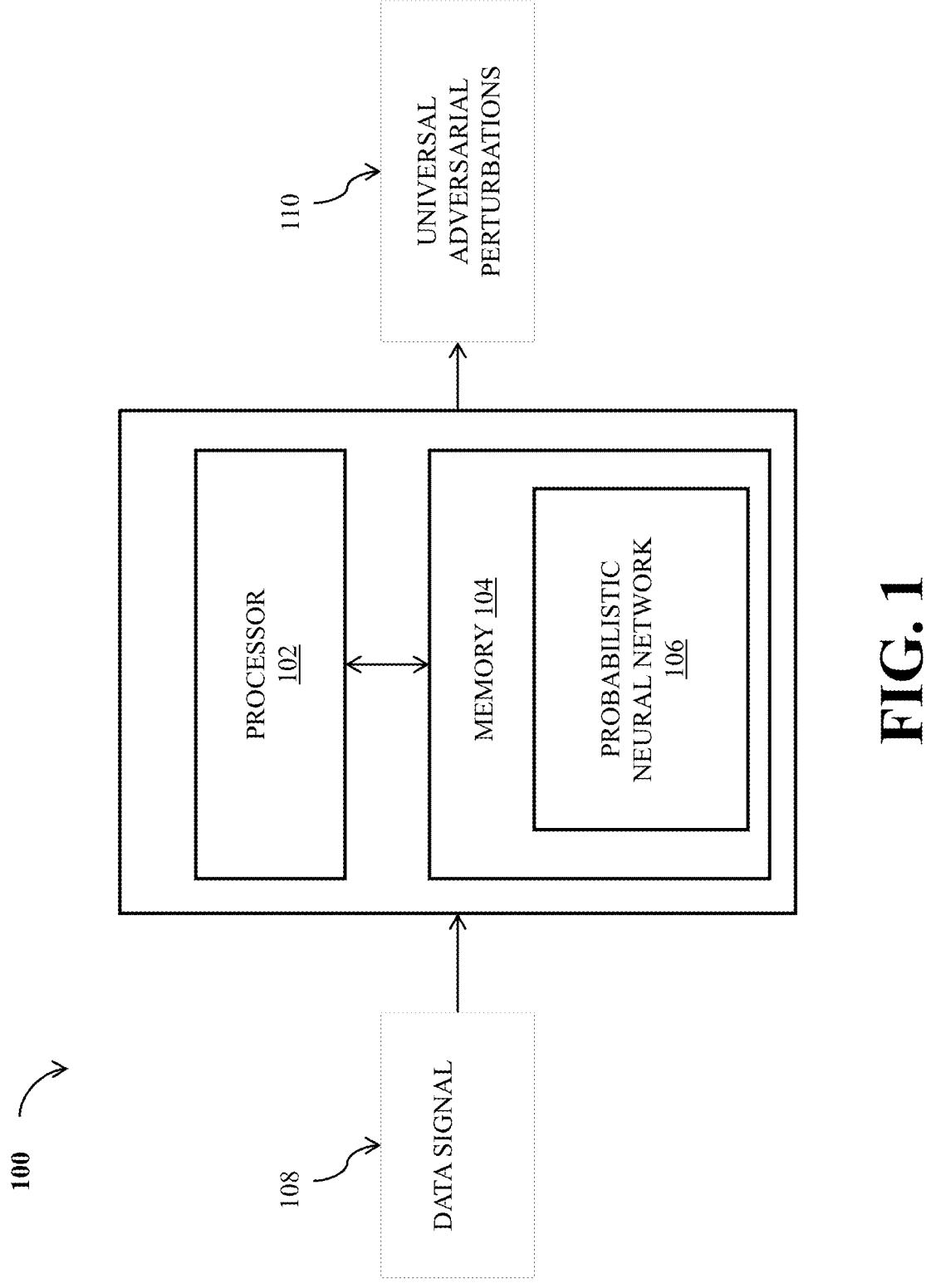
FIG. 1 shows a block diagram of the system for training a neural network for generating universal adversarial perturbations, according to some embodiments of the present disclosure.

FIG. 1 shows a schematic block diagram of a system 100 for training a neural network, such as a probabilistic neural network 106 for generating universal adversarial perturbations 110, according to some embodiments of the present disclosure. The system 100 includes a processor 102 and a memory 104 storing instructions to be executed by the processor 102. The processor 102 is configured to execute the stored instructions to cause the system 100 to collect a plurality of data samples corresponding to a data signal 108. Each of the plurality of data samples is identified by a label from a finite set of labels.

In some embodiments, the memory 104 stores a probabilistic neural network 106. The probabilistic neural network 106 is trained to transform the plurality of data samples into a corresponding plurality of perturbed data samples. Each data sample of the plurality of data samples is identified by a corresponding label in the finite set of labels. The data sample and associated label is inputted to the probabilistic neural network 106. Likewise, remaining data samples of the plurality of data samples and corresponding label of the finite set labels are inputted to the probabilistic neural network 106.

The transformation of the plurality of data samples also includes a bounded probability of deviation from the plurality of data samples. In particular, the plurality of data samples is transformed by maximizing a conditional entropy of the finite set of labels of the plurality of data samples conditioned on the plurality of perturbed data samples. The conditional entropy of the finite set of labels is unknown. In some example embodiments, the probabilistic neural network 106 is trained based on an iterative estimation of a gradient of the unknown conditional entropy of the finite set of labels.

Further, the trained probabilistic neural network is used to generate the universal adversarial perturbations 110. The universal adversarial perturbations 110 corresponds to a set of adversarial examples that is generated without any specific information of a target model.

The detailed procedure for generating the universal adversarial perturbations 110 is explained next with reference to FIG. 2.

Figure 2:
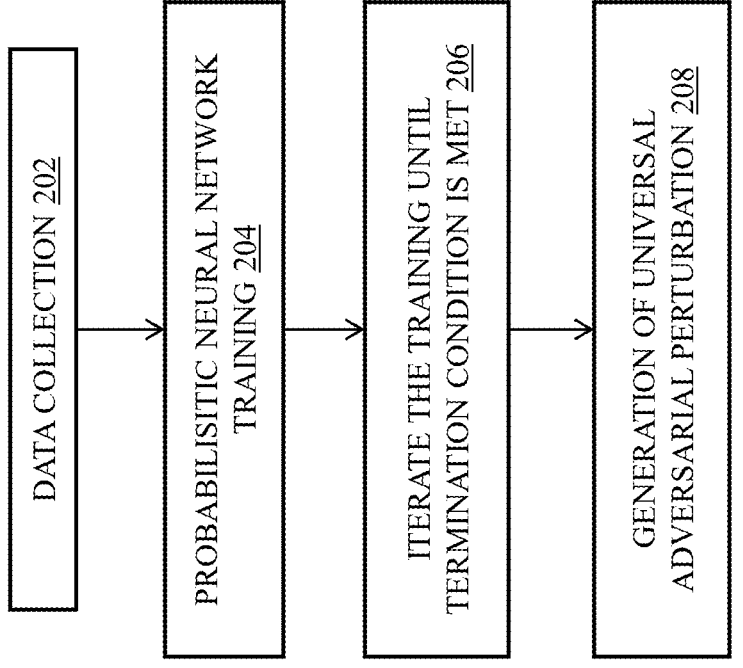
FIG. 2 shows a schematic diagram depicting a procedure for training a neural network for generating universal adversarial perturbations, according to some embodiments of the present disclosure.

FIG. 2 shows a diagrammatic representation depicting a procedure 200 for training the probabilistic neural network 106 for generating the universal adversarial perturbations 110, according to some embodiments of the present disclosure. The procedure 200 is performed by the system 100.

At step 202, a plurality of data samples of a data signal (e.g., the data signal 108) is collected. Each of the plurality of data samples is identified by a label from a finite set of labels.

At step 204, the probabilistic neural network 106 is trained for transforming the plurality of data samples into a corresponding plurality of perturbed data samples. The plurality of perturbed data samples has a bounded probability of deviation from the plurality of data samples. In some embodiments, the probabilistic neural network 106 is trained to transform the plurality of data samples by maximizing a conditional entropy of the finite set of labels of the plurality of data samples conditioned on the plurality of perturbed data samples. The conditional entropy of the finite set of labels is unknown. The probabilistic neural network is trained based on an iterative estimation of a gradient of the unknown conditional entropy of labels.

In some example embodiments, the maximizing of the conditional entropy is represented as, $$\max_{\substack{Z \in \chi: \\ d(X,Z) \leq \epsilon}} \ell(f_\alpha(Z), Y), \tag{1}$$

where, $f_\alpha$ denotes a target model parameterized by $\alpha$, $\ell$ denotes a loss function of the target model, X denotes the plurality of data samples with in (X) domain, Y denotes corresponding label in Y:={1, . . . , m}, and Z denotes an adversarial attack within an allowable perturbation $\epsilon > 0$, with respect to a distortion metric denoted by d: $\chi \times \chi \to [0, \infty]$. In some example embodiments, the distortion metric is selected for the perturbation. The distortion metric is based on an L-norm distance, such as $\ell_0$-norm distance, $\ell_p$-norm distance, $\ell_\infty$-norm distance, or the like.

In some embodiments, the maximizing of the conditional entropy is represented as minimizing unknown mutual information between a corresponding label of a data sample of the plurality of data samples and a perturbed data sample of the plurality of data samples. To that end, the maximizing of the conditional entropy represented as the minimizing of the unknown mutual information is solved based on following minimax optimization problem, $$\min_{\alpha} \mathbb{E} \left[ \max_{\substack{Z \in \chi: \\ d(X,Z) \leq \epsilon}} \ell(f_\alpha(Z), Y), \right] \tag{2}$$

where the expectation over the distribution of (X, Y).

In some cases, the plurality of data samples is received from a noisy channel I such cases, equation (2) is extended with a distribution of adversarial perturbations. The distribution of adversarial perturbations is represented as $(P_{Z|X}, Y \in D:=\{P_{Z|X,Y}: \Pr[d(X,Z) \leq \epsilon]=1\})$.

For an optimization over all decision rules $q \in P(\gamma|\chi)$, and the loss function, such as a cross-entropy loss function denoted as $\ell(q(Y|Z)):=-\log q(Y|Z)$, a minimax equality and equivalence is established with the maximum conditional entropy as follows, $$\min_q \max_{P_{Z|X,Y} \in D} \mathbb{E}[-\log q(Y|Z)] \tag{3}$$

-continued $$= \max_{P_{Z|X,Y} \in D} \min_q \mathbb{E}[-\log q(Y|Z)] \tag{4}$$

$$= \max_{P_{Z|X,Y} \in D} H(Y|Z) \tag{5}$$

where q represents a classifier, which as a function of the plurality of data samples (X) assigns likelihood values to the corresponding labels of the finite set of labels. The classifier is expressed in the form of a conditional distribution q (Y|X) that is evaluated, with respect to a data sample of the plurality of data samples (X) and corresponding label Y of the finite set of labels.

In particular, the classifier is evaluated in terms of an expected cross-entropy loss as denoted by expression $\mathbb{E}[-\log q(Y|Z)]$, where the expectation is taken with respect to (Z, Y) drawn according to the distribution $P_{Z,Y}$, which represents a generalized class of perturbation mechanism where a statistical distribution of the plurality of data samples is perturbed within a convex constraint set ($D$). The general notion of distributional perturbation includes direct sample perturbation, where the perturbation mechanism is equivalently modeled as a random channel of a conditional distribution $P_{Z|X,Y}$ with inputs (X, Y) as the original plurality of data samples.

The term H(Y) denotes entropy of the label. The entropy of the label is constant over the distribution of adversarial perturbations ($P_{Z|X,Y} \in D$). As the entropy of the label is constant, optimization, i.e., the maximizing of the conditional entropy is equivalently formulated as minimization of the unknown mutual information (denoted as I (Z;Y)) between the label and the perturbed data signal, as follows:

$$\max_{P_{Z|X,Y} \in D} H(Y|Z) = H(Y) - \min_{P_{Z|X,Y} \in D} I(Z;Y) \tag{6}$$

In some embodiments, the training of the probabilistic neural network 106 is iterative until a termination condition is met. At step 206, the termination condition is checked to terminate iteration for training the probabilistic neural network 106. In some example embodiments, the probabilistic neural network 106 is trained such that a distortion limit is not exceeded, i.e., $\Pr[d(X, Z) \leq \epsilon]=1$, by projecting output, i.e., perturbed data samples (Z) back with the distortion limit, when the distortion limit is exceeded.

After the training of the probabilistic neural network 106, at step 208, the trained probabilistic neural network 106 is used to generate the universal adversarial perturbations 110. The universal adversarial perturbations 110 (Z) is generated as an output (Z) representing a perturbation of the plurality of data samples. The output Z of the data perturbation mechanism is inputted to the classifier (q). In particular, the universal adversarial perturbations 110 are generated as $Z=g_\theta(X, Y)$, where $g_\theta$ is a parameterized, random mapping model. The model is implemented as a neural network with noise samples as an auxiliary input to provide randomization. The model $g_\theta$ defines the conditional distribution ($P_\theta$ (Z|X, Y)). The conditional distribution when combined with an underlying data distribution, such as $P_{X,Y}$, defines a marginal distribution for the plurality of perturbed data samples $P_\theta(Z)$ and conditional distribution of the plurality of perturbed data samples $P_\theta(Z|Y)$.

Such universal adversary perturbations 110 are used to attack any black-box target model with negligible computational overhead. The universal adversary perturbations 110 is also used to perform an adversarial training with minor cost as well. We refer to this defense as a universal defense response since the training samples again do not depend on any specific neural network model.

In some embodiments, the probabilistic neural network 106 is trained in an offline stage, which is described next in FIG. 3A.

Figure 3A:
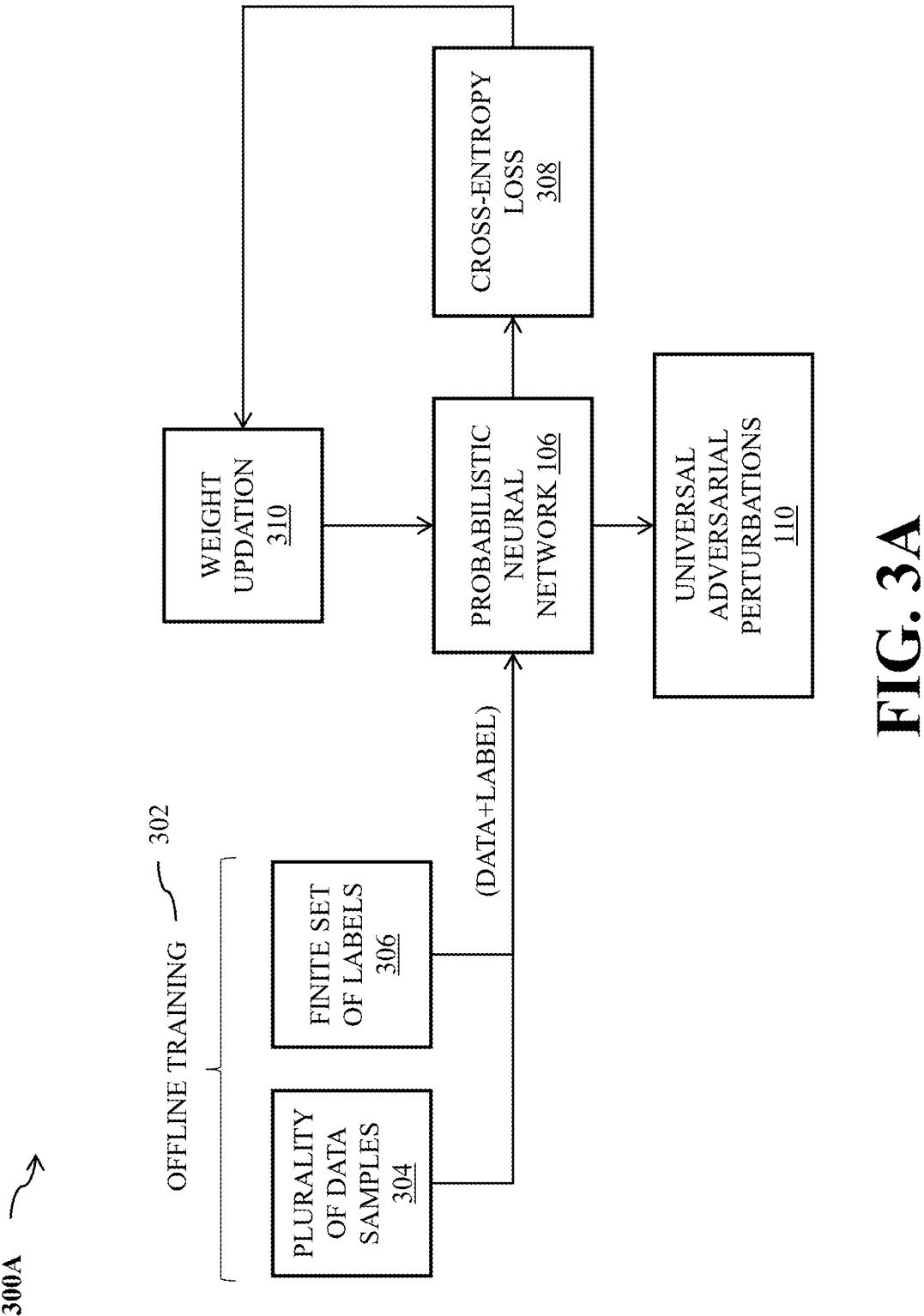
FIG. 3A shows a schematic diagram depicting an offline training stage for training a probabilistic neural network for generating universal adversarial perturbations, according to some embodiments of the present disclosure.

FIG. 3A shows a schematic diagram 300 depicting an offline training stage 302 for training probabilistic neural network model 106, according to some other embodiments of the present disclosure. In the offline training 302, a plurality of data samples 304 and a finite set of labels 306 are used. Each data sample in the plurality of data samples 304 is identified by a label in the finite set of labels 306. Each of the plurality of data samples 304 and corresponding label of the finite set of labels 306 is inputted to the probabilistic neural network 106.

The probabilistic neural network 106 is trained to minimize the mutual information as formulated in equation (6). To that end, a gradient of the mutual information is estimated. In some example embodiments, the gradient of the mutual information is estimated based on a mutual information gradient estimation (MIGE) method, as follows:

$$\nabla_\theta I(Z; Y) = \nabla_\theta H(Z) - \frac{1}{m} \sum_{y=1}^m \nabla_\theta H(Z \mid Y = y) \quad (7)$$

$$= \nabla_\theta \mathbb{E}[-\log P_\theta(Z)] + \frac{1}{m} \sum_{y=1}^m \nabla_\theta \mathbb{E}[\log P_\theta(Z \mid Y) \mid Y = y] \quad (8)$$

More specifically, the MIGE method changes variables to reformulate the above equation (8) as follows, $$\nabla_\theta I(Z; Y) = \mathbb{E}[-\nabla_Z \log P_\theta(Z) \nabla_\theta g_\theta(X, Y)] +$$
$$\frac{1}{m} \sum_{y=1}^m \mathbb{E}[\nabla_Z \log P_\theta(Z \mid Y) \nabla_\theta g_\theta(X, Y) \mid Y = y] \quad (9)$$

Further, the log density terms $\nabla_Z \log P_\theta(Z)$ and $\nabla_Z \log P_\theta(Z \mid Y = y)$ are estimated from the plurality of data samples that are drawn from the marginal distribution ($P_\theta(Z)$) and the conditional distribution (i.e., $P_\theta(Z \mid Y)$) of the perturbed data samples, respectively. In some example embodiments, the MIGE method estimates the gradient of the mutual information (i.e., the terms $\nabla_Z \log P_\theta(Z)$ and $\nabla \log P_\theta(Z \mid Y = y)$) using one or more score functions, such as a Stein Gradient Estimator, a Spectral Stein Gradient Estimator, a Kernel Exponential Family Estimator or the like for implicit distributions corresponding to the marginal distribution (i.e., $P_\theta(Z)$) and the conditional distribution (i.e., $P_\theta(Z \mid Y)$) of the perturbed data samples.

In some embodiments, an objective, such as an optimization objective for maximizing of the conditional entropy is converted into a Lagrangian form, as defined below, $$\max_v \lambda H_v(Y \mid Z) - D(v, \mu) \quad (10)$$

where $\lambda > 0$ is the Lagrange multiplier, and v represents a joint distribution of (Z, Y) implied by the model and data distribution, and $\mathbb{D}(v, \mu)$ represents the perturbation constraint converted to a distributional distance between the distribution v and a reference distribution μ. The conversion to the Lagrangian form generates a fixed-point characterization of an optimal solution of the joint distribution (v), as given by $$\frac{\partial \mathbb{D}(v, \mu)}{\partial v}(x, y) = \lambda \log v(x, y) - \frac{\lambda \log v(x)}{|Y|} + C \quad (11)$$

where $v(x) = \int v(x,y) dy$ denotes the marginal distribution for Z with respect to the joint distribution (v), and u(y) denotes the uniform distribution. The optimization objective is derived from the above fixed-point characterization by taking the gradient of both sides, with respect to x, and aiming to minimize the difference between the two gradients. Mathematically, this can be expressed as, $$\sum_y \mathbb{E}_x \left[ \ell \left( \nabla_x \frac{\partial \mathbb{D}(v, \mu)}{\partial v}(x, y), \lambda \nabla_x \log v(x, y) - \frac{\lambda \nabla_x \log v(x)}{|Y|} \right) \right] \quad (12)$$

where $\ell$ denotes a loss function (such as L2-distance or absolute distance) measuring a difference between the two gradient terms, and the expectation is estimated by an empirical average over the plurality of data samples. The left-most gradient in the above equation is determined analytically depending on the specific expression of the constraint $\mathbb{D}(v, \mu)$, whereas the two other gradients are determined using one or more score function estimators that provide estimates of $\nabla_x \log v(x, y)$ and $\nabla_x \log v(x)$ from the joint and marginal distributions, from $v(x, y)$ and $v(x)$, respectively, which are generated by the model.

The model is optimized to minimize the above objective via gradient descent methods, such as stochastic gradient descent that compute the gradient of the above objective with respect to parameters of the model. To that end, the training of the probabilistic neural network 106 is performed by minimizing a gradient-matching loss function that satisfies the fixed-point characterization.

Further, the probabilistic neural network model 106 is updated to minimize a loss function, i.e., a cross-entropy loss function 308 relative to the plurality of perturbed data samples. In one example embodiment, the probabilistic neural network 106 is updated based on a weight updation 310. The probabilistic neural network 106 generates the universal adversarial perturbations 110.

An overall offline training of the probabilistic neural network 106 to minimize the mutual information, is described next with reference to FIG. 3B.

Figure 3B:
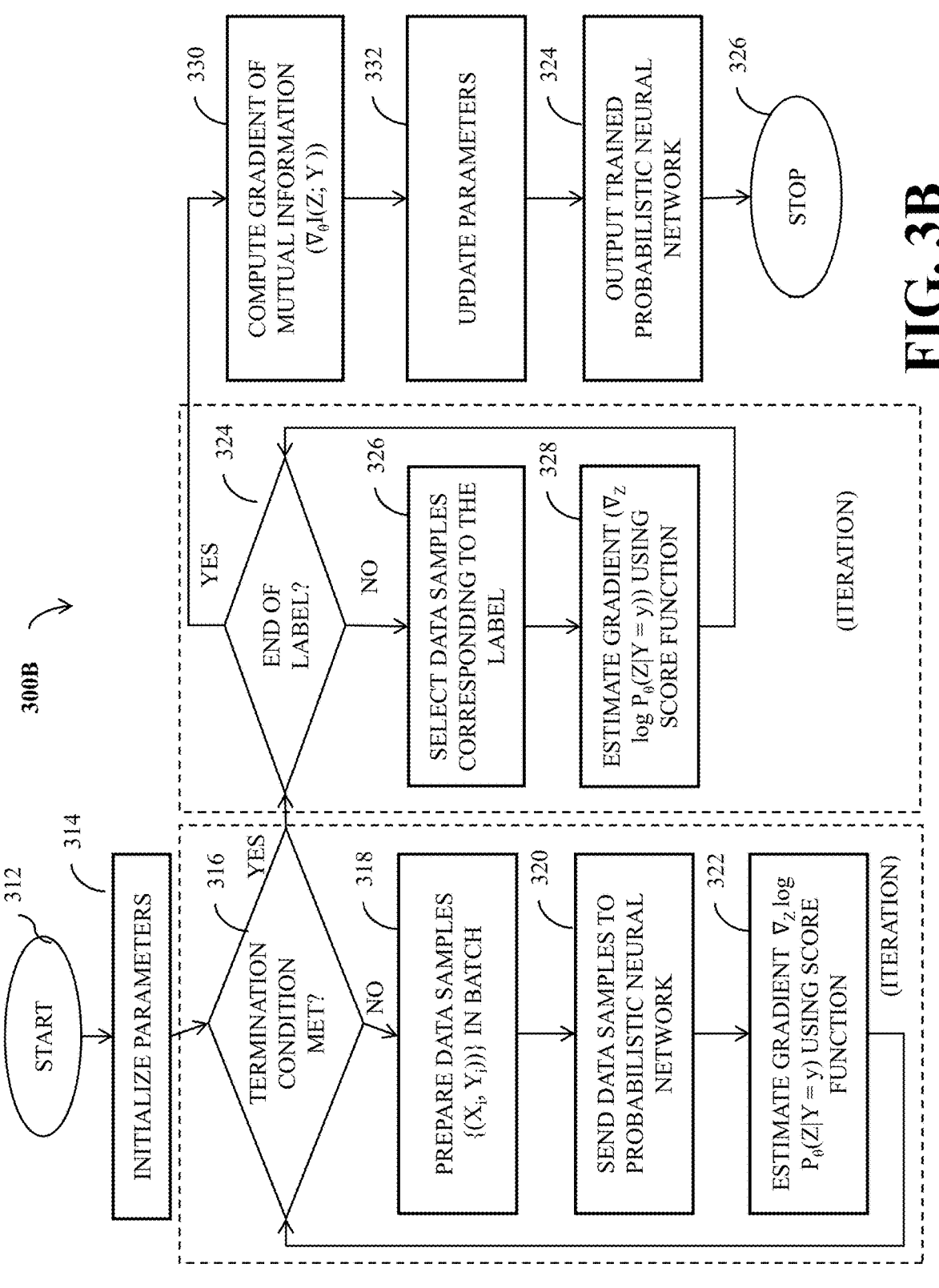
FIG. 3B shows a flowchart for the offline training stage of the probabilistic neural network, according to some embodiments of the present disclosure.

FIG. 3B shows a flowchart 300B for the offline training stage 302 of the probabilistic neural network 106, according to some embodiments of the present disclosure. The offline training 302 starts at step 312. At step 314, parameters for the probabilistic neural network 106 ($g_\theta$) are initialized. Once the parameters are initialized, iteration for training the probabilistic neural network 106 is initiated. At step 316, termination condition for terminating the training iteration of the probabilistic neural network 106 is checked. For instance, the termination condition of step 316 corresponds to end of the parameters.

For each training iteration of the probabilistic neural network 106, data samples are prepared in a data batch at step 318. In particular, the data samples are denoted as {

$$\{(X_i, Y_i)\}_{i=1}^n \sim^{iid} P_{X,Y},$$

where X is input data, Y is corresponding label of the input data (X) in a finite set of labels and $P_{X,Y}$ is distribution of the input data (X) corresponding to the finite set of labels (Y). At step 320, the data samples are inputted to the probabilistic neural network 106 to generate the universal adversarial perturbations 110 ($Z_i = g_\theta(X_i, Y)$). At step 322, a gradient of log density ($\nabla_Z \log P_\theta(Z)$) is estimated using a score function, such as a Spectral Stein Gradient Estimator. The gradient of log density (i.e., gradient of the unknown mutual information) is drawn from the plurality of data samples with an unknown probability density P (Z). The steps 318, 320 and 322 are iterated to determine a gradient over an entire batch of data samples {

$$\{Z\}_{i=1}^n.$$

The iteration is terminated when the termination condition is met at step 316.

If the termination condition is met, then estimation of a gradient of unknown conditional entropy of the finite set of labels begins and loops until end of the finite set of labels.

At step 324, condition corresponding to end of the finite set of labels is checked. At step 326, data samples corresponding for each label y=1, . . . , m, data samples are selected corresponding to the label y. At step 328, a gradient of the unknown conditional entropy of labels $\nabla_Z \log P_\theta(Z|Y=y)$ is estimated using the Spectral Stein Gradient Estimator over those data samples $Z_i$, where the corresponding $Y_i = y$. The gradient of the unknown conditional entropy of labels is estimated with respect to $\nabla_Z \log P_\theta(Z|Y=y)$. The steps 324, 326 and 328 are iterated until the gradient of unknown conditional entropy for the entire finite set of labels is completed, which is checked at step 324.

After the estimation of the gradient of unknown conditional entropy of the finite set of labels, a gradient of mutual information ($\nabla_\theta I(Z; Y)$ in equation (9)) is computed at step 330. The gradient of mutual information is computed with expectations approximated by an empirical mean over the data batch of the data samples. At step 332, a gradient descent method (e.g., a stochastic gradient descent) is performed to update the parameters of the probabilistic neural network 106 based on the computed gradient of mutual information.

At step 334, the trained probabilistic neural network is outputted. At step 324, the offline training ends.

In some embodiments, the trained probabilistic neural network is used to supplant or augment standard adversarial training methods for learning robust neural network models or classifiers. To that end, the trained probabilistic neural network is used to train a robust neural network model, which is described next in FIG. 4A.

Figure 4A:
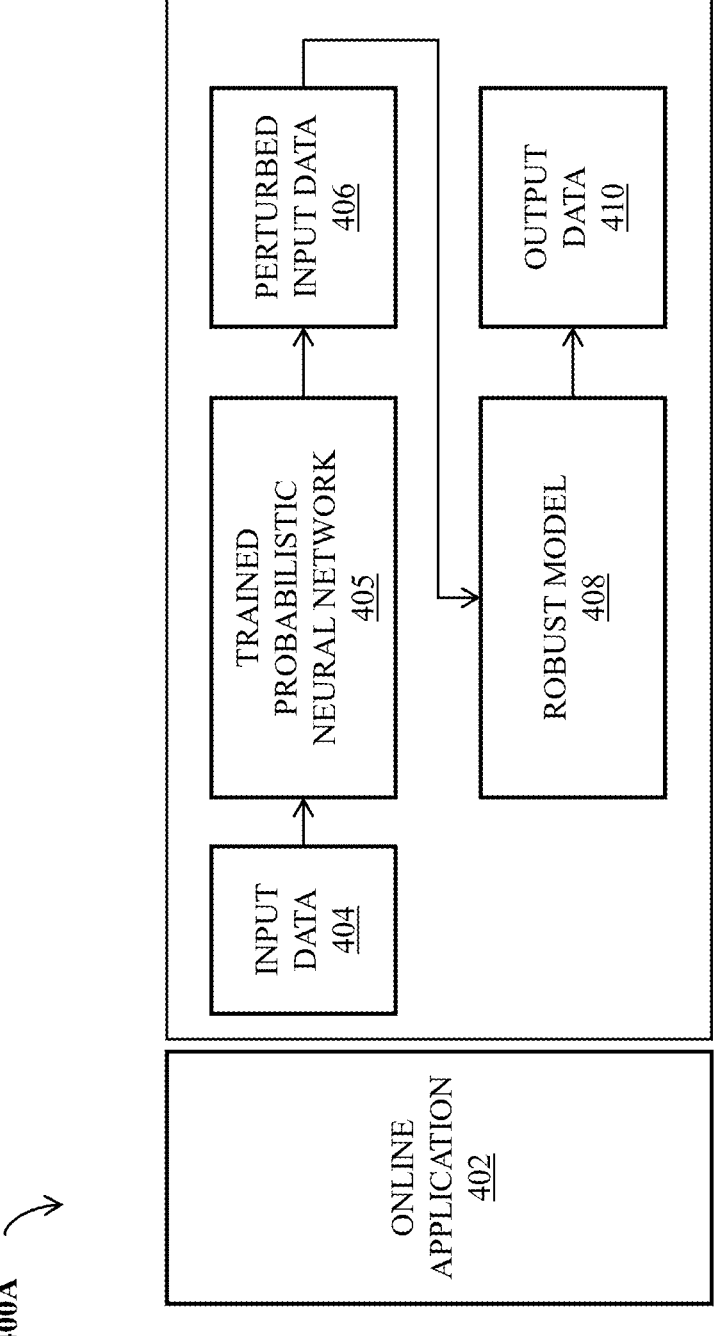
FIG. 4A shows a schematic diagram depicting an online application stage of the trained probabilistic neural network, according to some embodiments of the present disclosure.

FIG. 4A shows a schematic diagram 400A depicting an online application stage 402 of the trained probabilistic neural network 405, according to some embodiments of the present disclosure. In the online application stage 402, the trained probabilistic neural network 405 receives an input data 404 ($X_0$, Y). The trained probabilistic neural network 405 generates the universal adversarial perturbations 110 that perturb the input data 404 with negligible computational overhead. The trained probabilistic neural network 405 generates a perturbed input data 406 (denoted by Z) based on the perturbation of the input data 404. The perturbed input data 406 is used to train a robust neural network model 408.

In some example embodiments, the trained probabilistic neural network 405 is used as a randomized mapping (i.e., a random channel) that processes the input data 406 and outputs the perturbed input data 406. To that end, in order to realize randomized behavior of the trained probabilistic neural network 405, the robust neural network model 408 receives random seed noise from the perturbed input data 406 as an auxiliary input. The randomized behavior of the trained probabilistic neural network 405 implicitly specifies conditional distribution $P_{X|X_0,Y}$ representing a perturbation of the input data ($X_0$, Y). The randomized behavior of the trained probabilistic neural network 405 is maintained within some convex constraint set D using various processing methods. The various processing methods include a clipping operation, a rescaling operation, or the like. For example, if a constraint requires that the perturbed input data 406 remains within some distance of the input data 404, a clipping and/or rescaling operation is incorporated into the trained probabilistic neural network 405 to attain that the constraint is satisfied.

The robust neural network model 408 is represented as $X = G(X_0, Y, Z, \theta)$, where Z represents the random seed noise from the perturbed input data 406. In some example embodiments, the random seed noise is drawn from some specified distribution (such as standard multivariate normal distribution, uniform distribution, or the like), and $\theta$ represents the parameters (such as, weights, biases, or the like) of the trained probabilistic neural network 405.

Thus, the trained probabilistic neural network that generates the universal adversarial perturbations 110 is used in robust machine learning to produce robust models, such as the robust model 308 that resist effects of adversarial data perturbations. Likewise, the trained probabilistic neural network that generates the universal adversarial perturbations 110 is also used in privacy-preserving data processing to process an input data in a privacy-preserving manner, i.e., concealing sensitive information, while maintaining fidelity or utility of the input data. The fidelity or utility of the input data is captured by constraining the privacy-preserving data mechanism to allow small data perturbations of the input data. For instance, the small data perturbations includes perturbations of the input data, such as $\epsilon = 0.3$, 0.4, 0.5 with respect to a distortion metric, such as $\ell_2$ or $\ell_\infty$ distance. The perturbation of the input data prevents a privacy attacker from recovering sensitive information in the input data.

To that end, different bounds are selected for bounding the probability of deviation of the plurality of perturbed data samples from the plurality of data samples based on an objective of the trained probabilistic neural network. The objective of the trained probabilistic neural network includes a data-privacy objective and a robust learning objective. A bound for the data-privacy objective is greater than a bound for the robust learning objective.

Figure 4B:
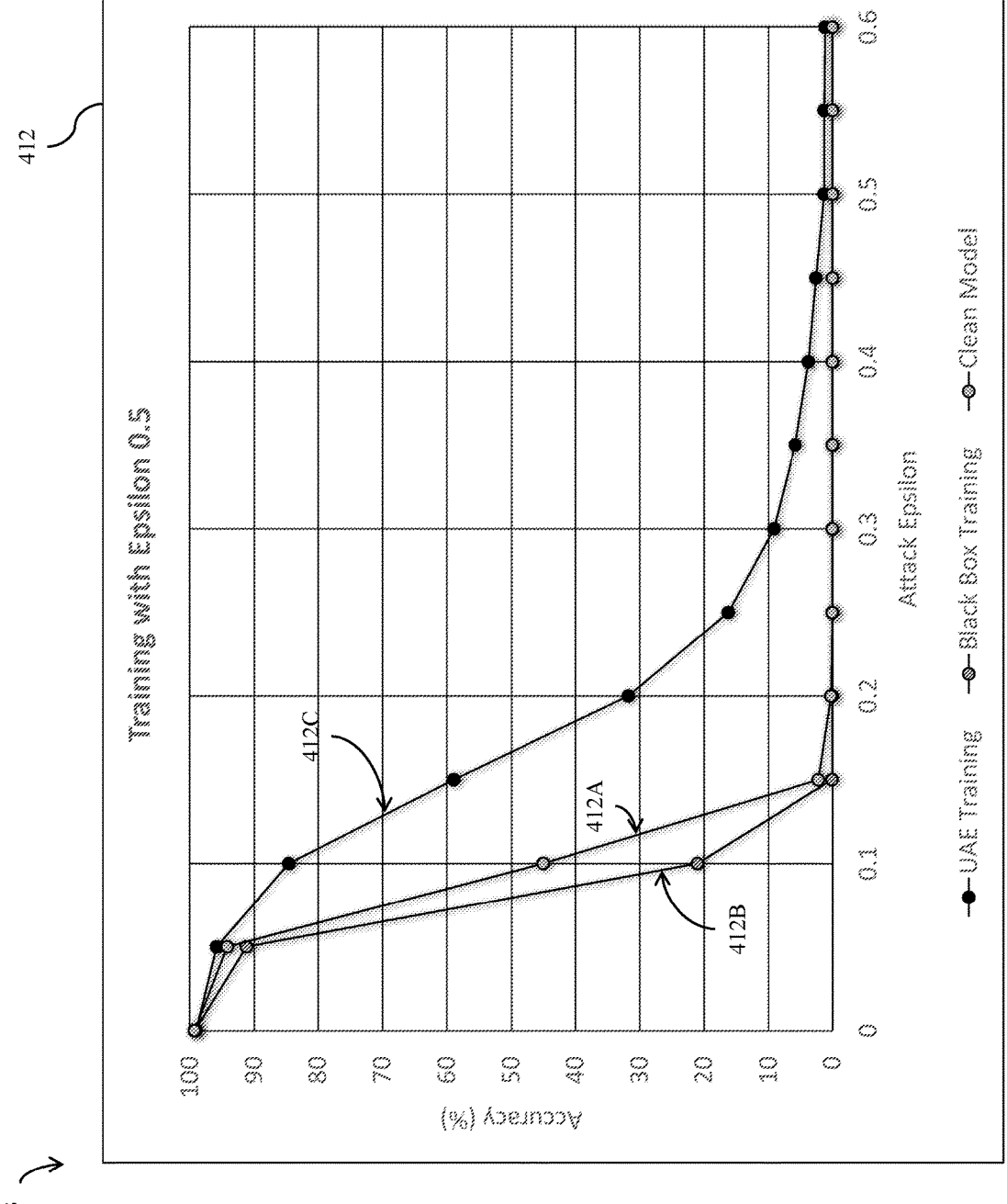
FIGS. 4B-4D illustrate graphical representations depicting evaluation of the trained probabilistic neural network, according to some embodiments of the present disclosure.
Figure 4C:
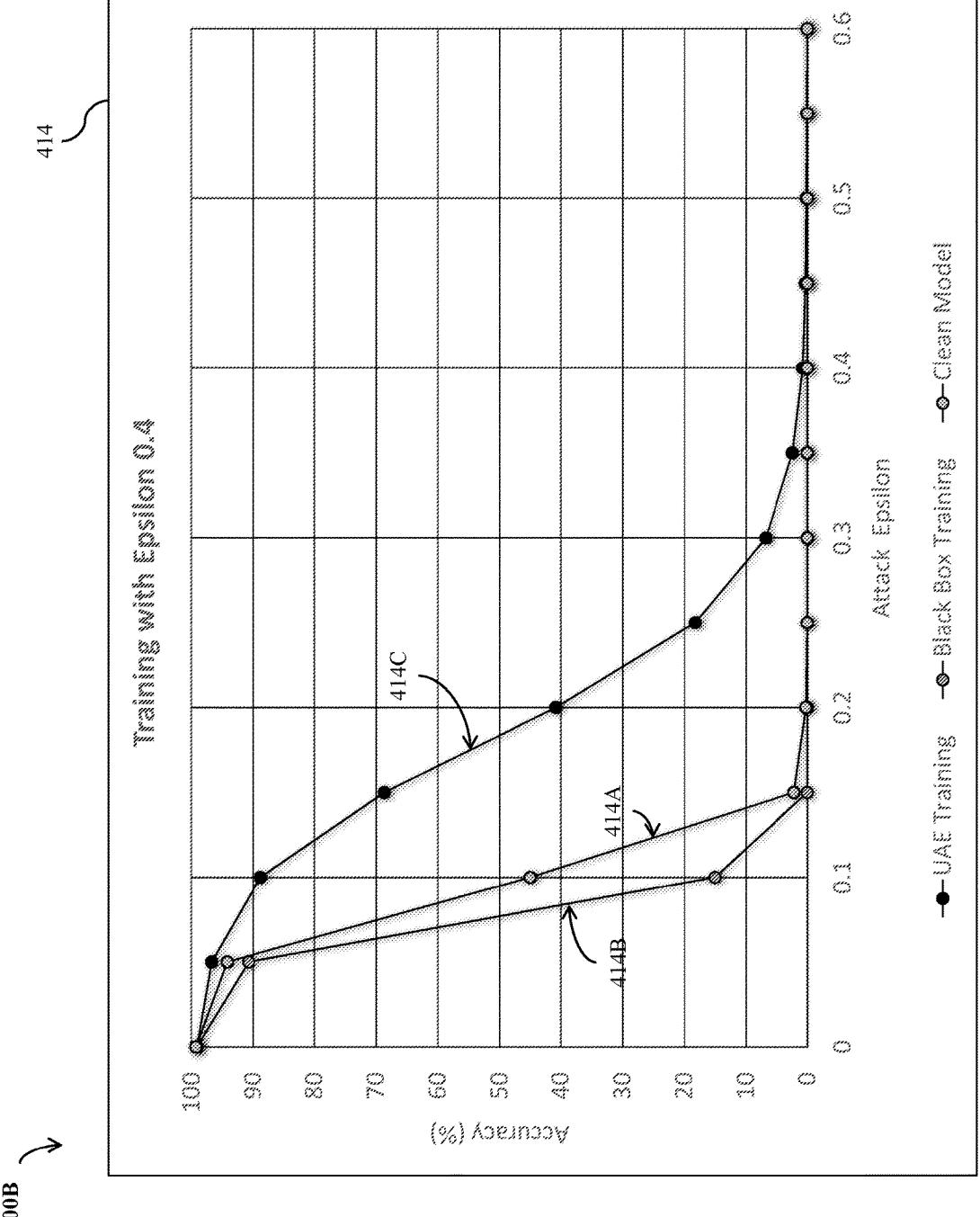
Figure 4D:
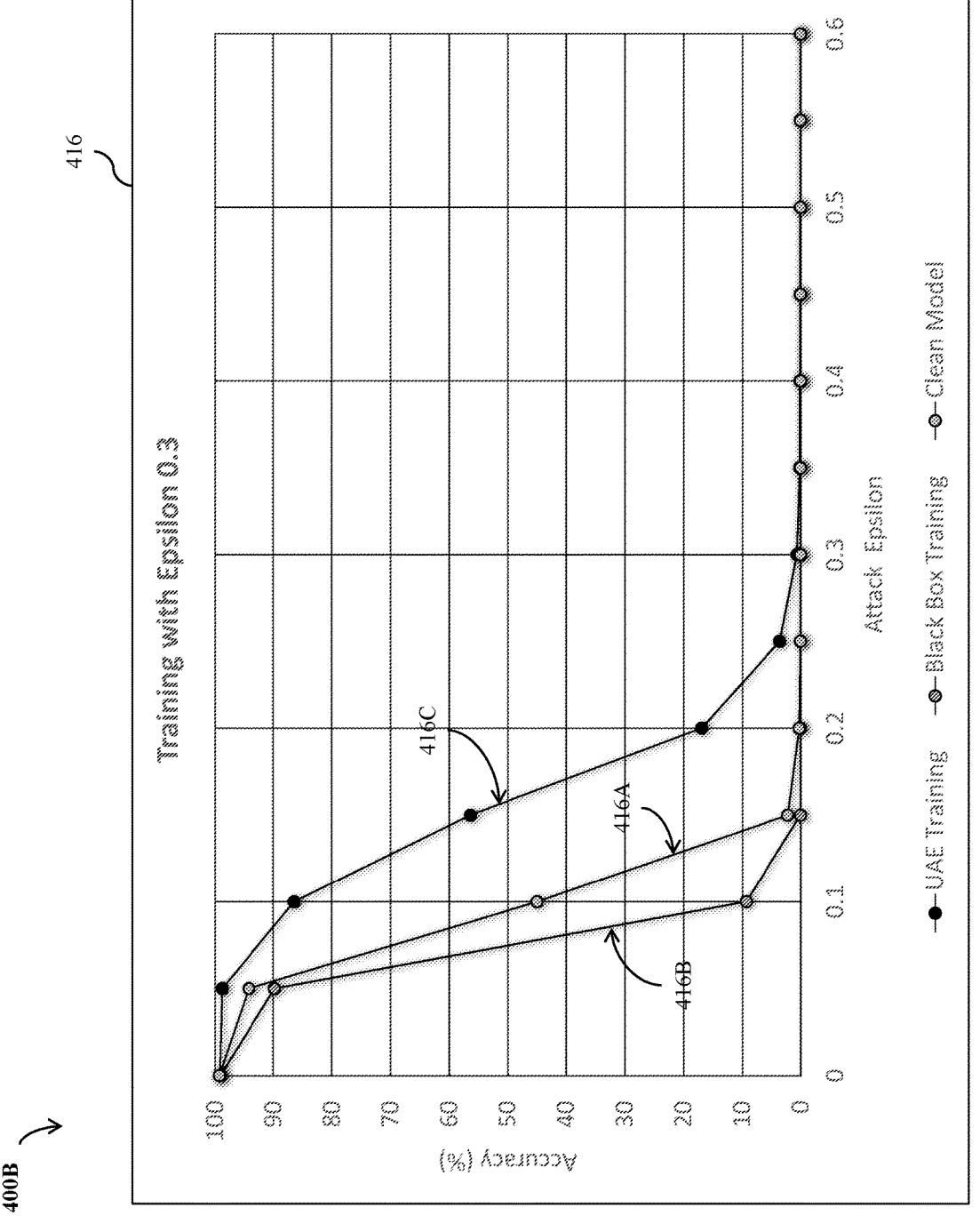

FIGS. 4B-4D illustrate graphical representations 400B depicting evaluation of the trained probabilistic neural network 405, according to some embodiments of the present disclosure. The graphical representations 400B include a graphical plot 412 illustrated in FIG. 4B, a graphical plot 414 illustrated in FIG. 4C, and a graphical plot 416 illustrated in FIG. 4D that depict effect of training a model, such as the robust model 408 with adversarial examples, such as the universal adversarial perturbations 110 of $\ell_\infty$ distance $\epsilon = 0.5$, 0.4, 0.3. Each of the graphical plot 412, the graphical plot 414 and the graphical plot 416 shows evaluation of performance of the robust model 408 against different attack models, such as a white-box adversarial attack model (e.g., projected gradient descent (PGD) attack model) and a black-box adversarial trained model (e.g., a substitute black-box attack model).

The robust model 408 and the black-box adversarial trained model have comparable computation costs, as both the robust model 408 and the black-box model generate adversarial examples before their corresponding training starts. Further, a clean data model is also evaluated as a baseline. The three models, i.e., the clean data model, the black-box model and the robust model 408 are trained on three different too distance attacks at different strengths, such as $\epsilon$=0.5, 0.4, 0.3.

As shown in the graphical plot 412, performance of the clean data model with no adversarial training is depicted by curve 412A, performance of a black-box adversarial trained model is depicted by a curve 412B and performance of the robust model 408 is depicted by a curve 412C. The clean data model, the black-box adversarial trained model and the robust model 408 are trained with a distortion metric $\ell_\infty$ distance $\epsilon$=0.5. Likewise, in the graphical plot 414, performance of the clean data model is depicted by a curve 414A, performance of the black-box adversarial trained model is depicted by a curve 414B and performance of the robust model 408 is depicted by a curve 414C. The clean data model, the black-box adversarial trained model and the robust model 408 are trained with a distortion metric $\ell_\infty$ distance $\epsilon$=0.4. In the graphical plot 416, performance of the clean data model is depicted by a curve 416A, performance of the black-box adversarial trained model is depicted by a curve 416B and performance of the robust model 408 is depicted by a curve 416C. The clean data model, the black-box adversarial trained model and the robust model 408 are trained with a distortion metric $\ell_\infty$ distance $\epsilon$=0.3.

As shown in FIGS. 4B-4D, the curves 412B, 414B and 416B depict that the black-box adversarial trained model is vulnerable than the clean data model that is depicted by the curves 412A, 414A and 416A. Further, the curves 412C, 414C and 416C corresponding to the robust model 408 indicate that training the robust model 408 based on the universal adversarial perturbations 110 performs fast and efficient. To that end, the probabilistic neural network 405 that trains the robust model 408 using the universal adversarial perturbations 110 is useful in large scale adversarial training of robust machine learning models.

In some embodiments, the probabilistic neural network 106 is used in a universal adversarial perturbation system, which is described next with reference to FIG. 5.

Figure 5:
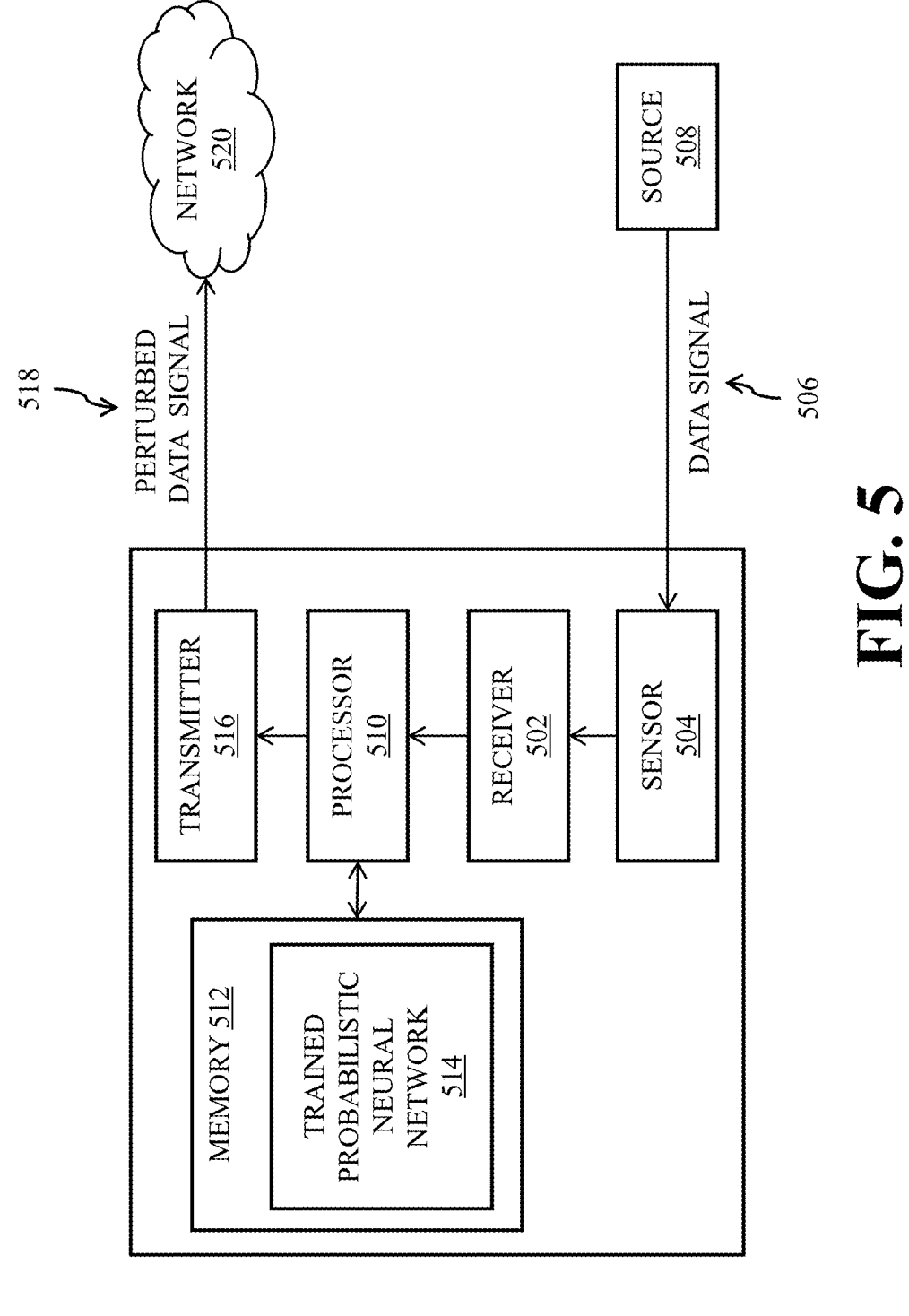
FIG. 5 shows a universal adversarial perturbation system, according to some embodiments of the present disclosure.

FIG. 5 shows a universal adversarial perturbation system 500, according to some embodiments of the present disclosure. The universal adversarial perturbation system 500 includes a receiver 502, a sensor 504, a processor 510, a memory 512 and a transmitter 516.

The receiver 502 is operatively connected to the sensor 504 to receive a sensed data signal 506 measured from a source 508 of the data signal 506. The sensed data signal includes one or more of vital signs (e.g., heartbeat, pulse rate, or the like) of a subject. In some example embodiments, the sensor 504 is configured to sense the data signal 506 based on a type of a relative placement in an arrangement between the sensor 504 and a source of the sensed data signal 506. The sensor 504 corresponds to a touch-based sensor or a touchless sensor, such as a camera, a motion sensor, a vital sign sensor, an optical sensor, or the like. The sensor 504 is placed at a predefined distance from the source 508 that cause a nuisance variation, i.e., noise that impacts the type of the relative placement. In some embodiments, the type of the relative placement is specified by the corresponding label of each of plurality of data samples corresponding to the data signal 506. For example, the type of the relative placement could be due to variations in the physical orientation of the sensor relative the subject being measured, or even variations inherent to the subject under measurement.

In some embodiments, the processor 510 is configured to execute a trained probabilistic neural network 514 stored in the memory 512. The trained probabilistic neural network 514 is an example of a trained version of the probabilistic neural network 106. The trained probabilistic neural network 514 has been trained to transform the plurality of data samples corresponding to the sensed data signal 506 into a plurality of perturbed data samples having a bounded probability of deviation. The bounded probability of deviation deviates the plurality of perturbed data samples from the plurality of data samples by maximizing a conditional entropy of the finite set of labels of the plurality of data samples conditioned on the plurality of perturbed data samples. In some embodiments, the trained probabilistic neural network 514 has been trained to reduce an unknown mutual information between the label classifying the type of the relative placement and the plurality of perturbed data samples. The minimizing of the unknown mutual information is solved based on the optimization problem of equation (2).

Further, the plurality of perturbed data samples is transmitted as a perturbed data signal 518 over a wireless or a wired communication channel, such as a network 520 via a transmitter 516.

Figure 6:
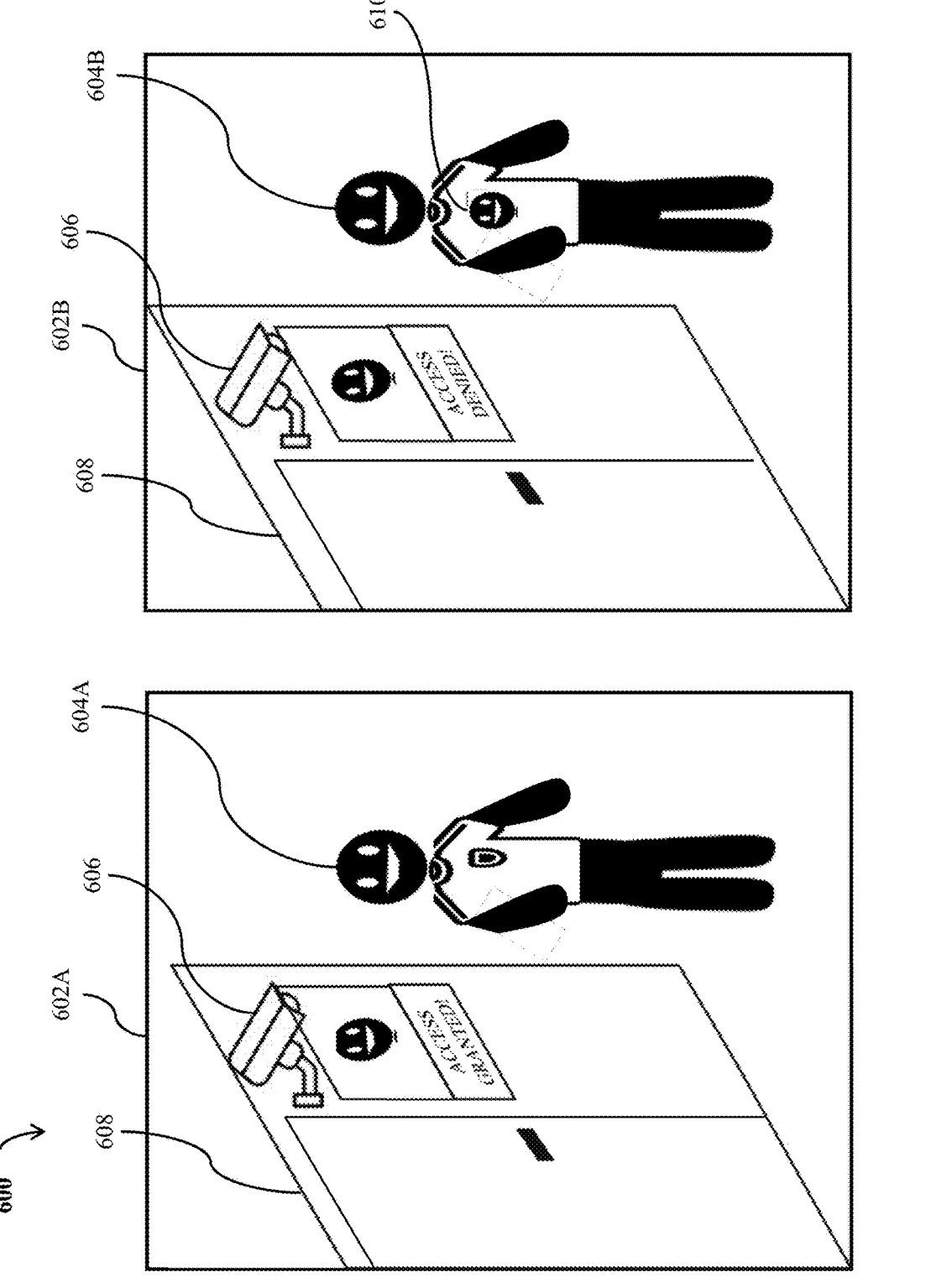
FIG. 6 shows a use case of using the universal adversarial perturbation system, according to some embodiments of the present disclosure.
Figure 7:
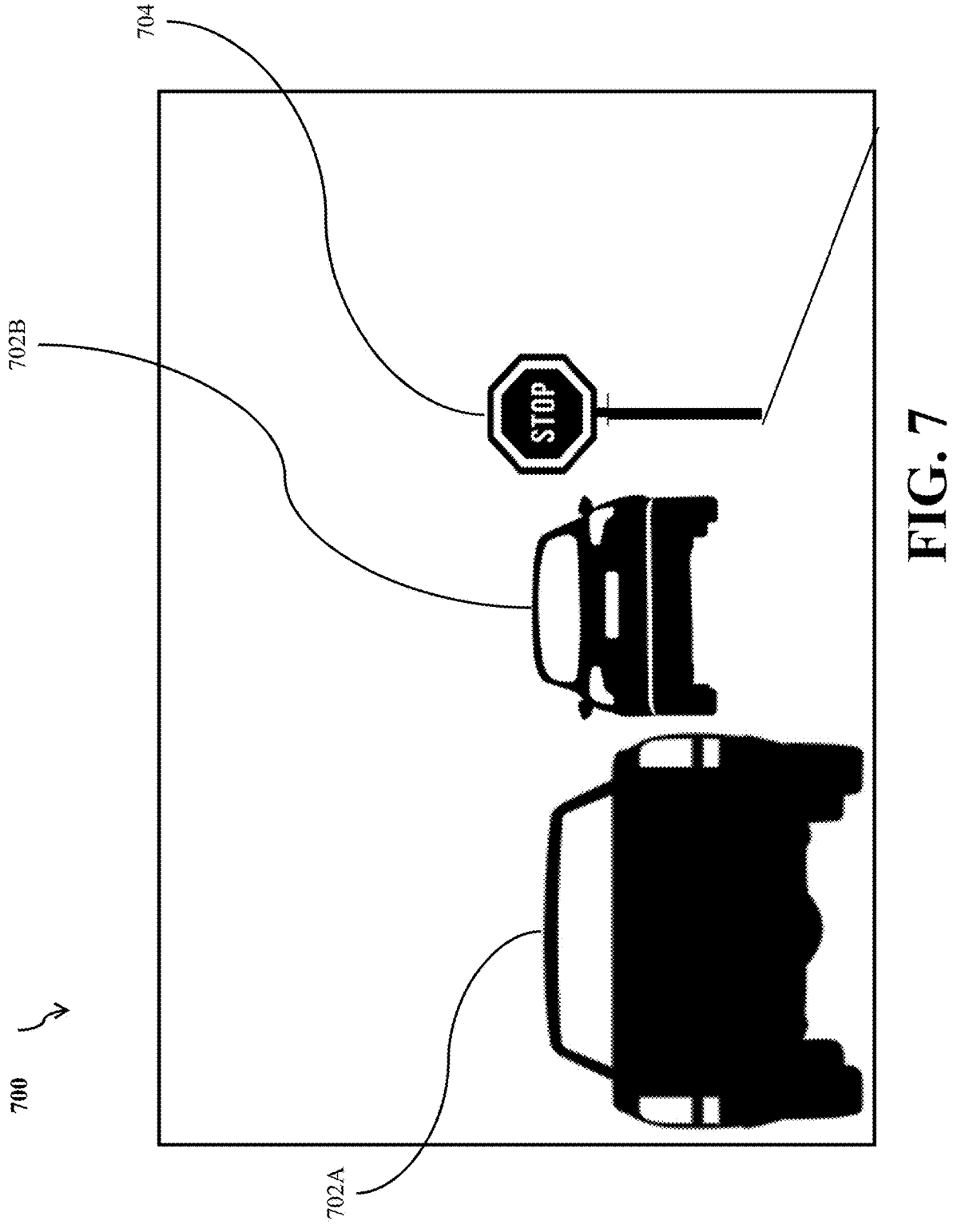
FIG. 7 shows a use case of using the universal adversarial perturbation system, according to some other embodiments of the present disclosure.
Figure 8:
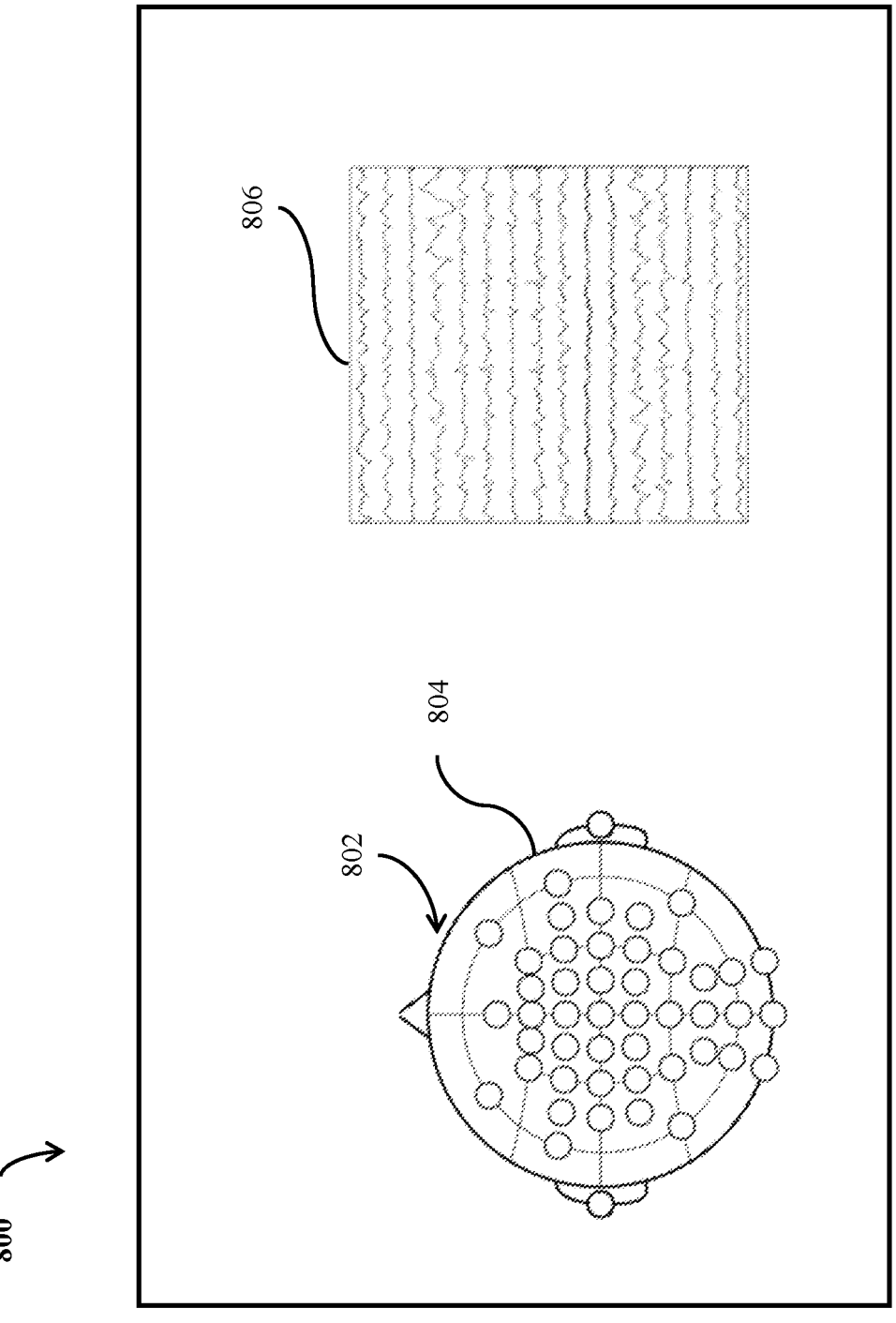
FIG. 8 shows a use case of using the universal adversarial perturbation system, according to yet some other embodiments of the present disclosure

Such universal adversarial perturbation system 500 is used in machine learning and/or privacy-preserving data processing applications, which are described further in FIG. 6, FIG. 7 and FIG. 8.

FIG. 6 shows a use case 600 of using the universal adversarial perturbation system 500, according to some embodiments of the present disclosure. The use case 600 includes two different scenarios, such as a scenario 602A and a scenario 602B. In the scenario 602A, a user 604A is identified to allow access to a restricted area, such as a security room 608. The user 604A is identified using a sensor, such as a camera 606 that captures facial image of the user 604A. In some cases, the camera 606 is connected to the universal adversarial perturbation system 500 via a network, such as the network 520. In some other cases, the camera 606 is integrated to the universal adversarial perturbation 500. The camera 606 transmits the capture facial image of the user 604A to the universal adversarial perturbation system 500. The universal adversarial perturbation system 500 processes the captured facial image of the user 604A. The captured facial image of the user 604A is processed using the trained probabilistic neural network 514 such that sensitive information, e.g., identity marks corresponding to the user 604A is concealed and utility of the captured facial image of the user 604A is maintained.

After the processing of the captured facial image of the user 604A, the universal adversarial perturbation system 500 transmits the processed information to a control system (not shown) to identify the user 604A and grant access based on the identification of the user 604A.

In the other scenario 602, an intruder 604B attempts to access the room 608 using a facial image, such as a photograph 610 of the user 604A. The camera 606 captures the facial image of the user 604A in the photograph 610. The photograph 610 is processed using the universal adversarial perturbation system 500. However, the photograph 610 does not include the sensitive information that is protected from such intrusion. Accordingly, the intruder 604B is denied accessing the room 606 even though the photograph 610 containing the facial image of the user 604A is used. Thus, the concealed sensitive information of the user 604A is prevented from unwanted attacks by the intruder 604B.

FIG. 7 shows a use case 700 of using the universal adversarial perturbation system 500, according to some other embodiments of the present disclosure. The use case 700 corresponds to vehicle assistance navigation system (not shown) of a vehicle 702A. The vehicle assistance navigation system is connected with the universal adversarial perturbation system 500. The vehicle assistance navigation system is connected to a camera of the vehicle 702A, such as a front camera capturing road scenes or views. In one illustrative example scenario, the camera captures a road sign 704 that displays "STOP" sign. The captured road sign 704 is transmitted to the universal adversarial perturbation system 500. The universal adversarial perturbation system 500 processes the captured road sign 704 using the trained probabilistic neural network 514. The captured road sign 704 is processed using the universal adversarial perturbation 110 to generate a robust model for identifying the "STOP" sign in the road sign 704. The robust model is used by the vehicle assistance navigation system to accurately identify the road sign 704 and prevent the vehicle 702A from colliding with another vehicle, such as a vehicle 702B ahead of the vehicle 702A.

FIG. 8 shows a use case 800 of using the universal adversarial perturbation system 500, according to yet some other embodiments of the present disclosure. The use case 800 corresponds to sense one or more vital signs, such brain signals 806 of a subject 802 by a sensor 804. The sensor 804 is an example of the sensor 504 that senses the brain signals 806 based on a type of a relative placement in an arrangement between the sensor 804 and a head of the subject 802. The type of the relative placement is specified by a corresponding label of the brain signals 806.

When the sensor 804 is placed on a head of the subject 802, there is nuisance variation due to the relative placement between the sensor 804 and the head of the subject 802. The nuisance variation causes an inaccurate reading of the brain signals 806. The inaccurate reading results into a faulty diagnosis of the brain signals 806. To that end, the brain signals 806 is transmitted to the universal adversarial perturbation system 500. The universal adversarial perturbation system 500 processes brain signals 806 using the trained probabilistic neural network 514. The trained probabilistic neural network 514 processes the brain signals 806 using the universal adversarial perturbations to overcome the nuisance variation using the universal adversarial perturbation system 500 and output an accurate reading of the brain signals 806, which improves diagnosis of the one or more vital signs of the subject 802.

FIG. 9 shows a method 900 flow diagram for generating universal adversarial perturbations, according to some embodiments of the present disclosure. The method 900 is performed by the system 100.

At step 902, the method 900 includes collecting a plurality of data samples, wherein each of the plurality of data samples is identified by a label from a finite set of labels. The plurality of data samples corresponds to the data signal 108.

At step 904, the method 900 includes training a probabilistic neural network, such as the probabilistic neural network 106 for transforming the plurality of data samples into a plurality of perturbed data samples. The plurality of perturbed data samples includes a bounded probability of deviation from the plurality of data samples that is obtained by maximizing a conditional entropy of the finite set of labels of the plurality of data samples conditioned on the plurality of perturbed data samples. The conditional entropy is unknown as statistical distributions of the plurality of data samples are unknown. To that end, the maximizing of the conditional entropy is represented as minimizing an unknown mutual information between the label and correspond perturbed data sample for fixed entropies of the finite set of labels. In some example embodiments, the probabilistic neural network is trained based on an iterative estimation of a gradient of the unknown conditional entropy (refer FIG. 3A). The gradient of the unknown conditional entropy of the finite set of labels is estimated based on a mutual information gradient estimation method (refer FIG. 3B).

At step 906, the method 900 includes generating the universal adversarial perturbations based on the trained probabilistic neural network. In some embodiments, the universal adversarial perturbations is a multi-objective perturbation. In the multi-objective perturbation, different bounds are selected for bounding the probability of deviation of the plurality of perturbed data samples from the plurality of data samples. The different bounds are selected based on an objective of the probabilistic neural network. The objective of the probabilistic neural network includes a data-privacy objective and a robust learning objective. A bound for the data-privacy objective is greater than a bound for the robust learning objective.

Figure 10:
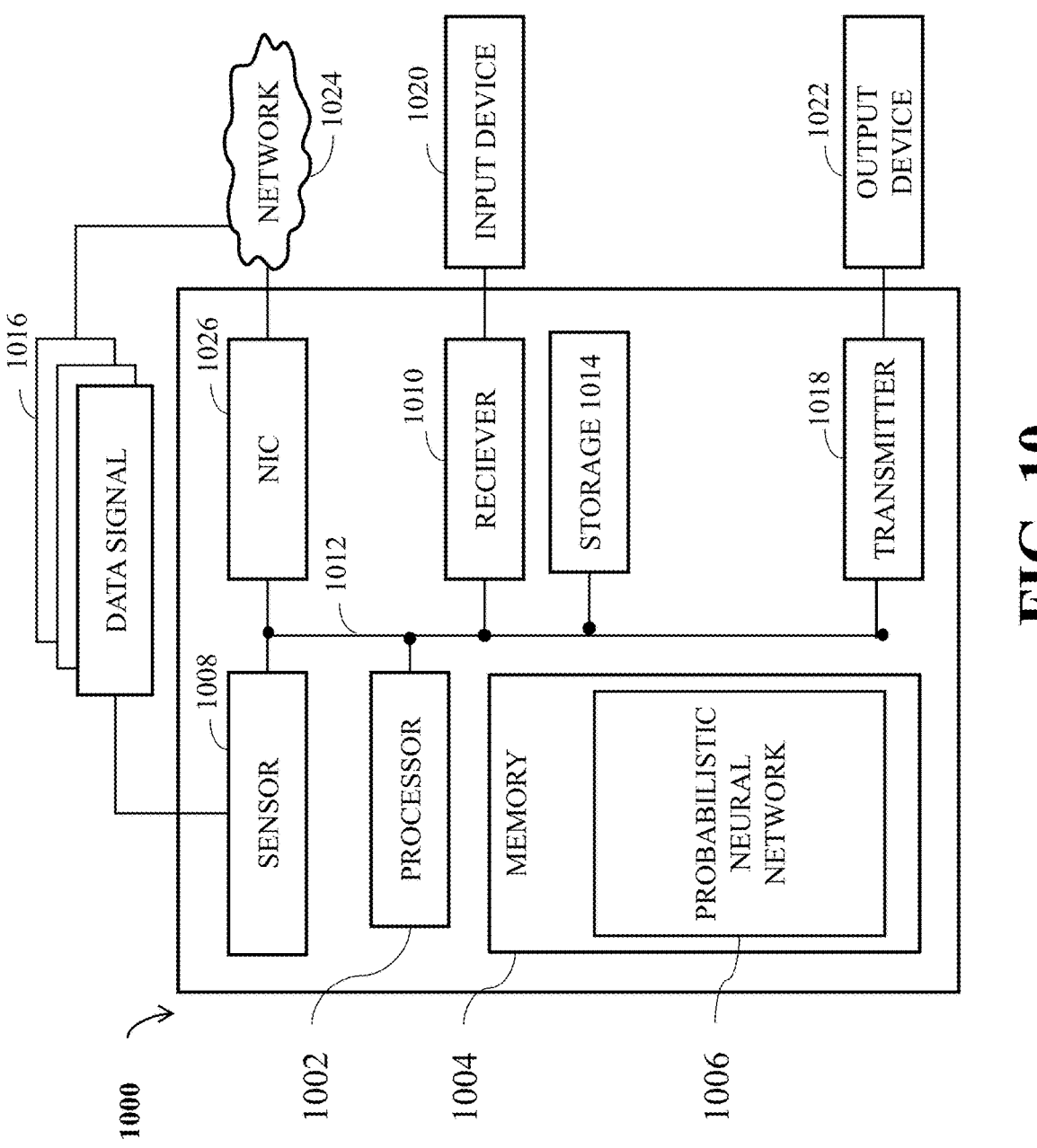
FIG. 10 shows a system for training a neural network for generating universal adversarial perturbations, according to some example embodiments of the present disclosure.

FIG. 10 shows a block diagram of a system 1000 for generating the universal adversarial perturbations, according to some embodiments of the present disclosure. The system 1000 includes at least one processor 1002 and a memory 1004 having instructions stored thereon including executable modules for being executed by the at least one processor 1002 during the controlling of the system 1000. The memory 1004 is embodied as a storage media such as RANI (Random Access Memory), ROM (Read Only Memory), hard disk, or any combinations thereof. For instance, the memory 1004 stores instructions that are executable by the at least one processor 1002. In one example embodiment, the memory 1004 is configured to store a probabilistic neural network 1006. The probabilistic neural network 1006 corresponds to the probabilistic neural network 106.

The at least one processor 1002 is be embodied as a single core processor, a multi-core processor, a computing cluster, or any number of other configurations. The at least one processor 1002 is operatively connected to a sensor 1008, a receiver 1010 via a bus 1012. In an embodiment, the at least one processor 1002 is configured to collect a plurality of data samples. In some example embodiments, the plurality of data samples is collected from a receiver 1010. The receiver 1010 is connected to an input device 1020 via a network 1024. Each of the plurality of data samples is identified by a label from a finite set of labels. The finite set of labels is stored in a storage 1014. In some other example embodiments, the plurality of data samples is collected from a sensor 1008. The sensor 1008 receives a data signal 1016 measure from a source (not shown). In some embodiments, the sensor 1008 is configured to sense the data signal 1016 based on a type of a relative placement in an arrangement between the sensor 1008 and a source of the sensed data signal 1016. The type of the relative placement is specified by a corresponding label of each of the plurality of data samples.

Additionally or alternatively, the system 1000 is integrated with a network interface controller 1026 to receive the plurality of data samples using the network 1024.

The at least one processor 1002 is also configured to train the probabilistic neural network for transforming the plurality of data samples into a corresponding plurality of perturbed data samples. The plurality of perturbed data samples has a bounded probability of deviation from the plurality of data samples. The bounded probability is obtained by maximizing an unknown conditional entropy of the finite set of labels of the plurality of data samples conditioned on the plurality of perturbed data samples. In particular, the at least one processor 1002 is configured to represent the maximizing of the conditional entropy as minimizing an unknown mutual information between the label and a perturbed data sample of the plurality of data samples for fixed entropies of the finite set of labels. In some example embodiments, an objective of the maximizing conditional entropy of the finite set of labels within the bounded probability of deviation is converted to a corresponding Lagrangian form that yields a fixed-point characterization of an optimal solution for maximizing the conditional entropy. The training of the probabilistic neural network 1006 is performed by minimizing a gradient-matching loss function that satisfies the fixed-point characterization.

In some embodiments, the probabilistic neural network 1006 is trained to reduce an unknown mutual information between the label classifying the type of the relative placement between the sensor 1008 and a source of the sensed data signal 1016 and a plurality of perturbed data samples. The plurality of perturbed data samples is obtained based on a transformation of the plurality of data samples by the trained probabilistic neural network 1006.

In some embodiments, the probabilistic neural network 1006 is trained based on an iterative estimation of a gradient of the unknown conditional entropy of the finite set of labels. The gradient of the unknown conditional entropy of labels is estimated based on a gradient of the unknown mutual information. The gradient of the unknown mutual information is decomposed as an entropy of the perturbed data sample without the conditional entropy of the perturbed data sample conditioned on the label. The conditional entropy of the perturbed data sample conditioned on the label is decomposed as a summation of entropy of the perturbed data sample for each label of corresponding data sample weighted by a probability of each label. A gradient of the entropy of the perturbed data sample and the entropy of the perturbed data sample for each label are estimated using a score function estimation method. The score function estimation method includes one or combination of a Stein Gradient Estimator, a Spectral Stein Gradient Estimator, and a Kernel Exponential Family Estimator.

The trained probabilistic neural network 1006 generates universal adversarial perturbations (e.g., the universal adversarial perturbations 110) that are transmitted via a transmitter 1018. Additionally or alternatively, the transmitter 1018 is coupled with an output device 1022 to output the perturbed data signal over a wireless or a wired communication channel, such as the network 1024. The output device 1022 includes a computer, a laptop, a smart device, or any computing device that is used for preventing adversarial attacks in applications installed in the output device 1022.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The above-described embodiments of the present disclosure may be implemented in any of numerous ways. For example, the embodiments may be implemented using hardware, software or a combination thereof. When implemented in software, the software code may be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Therefore, it is the object of the appended claims to cover all such variations and modifications as come within the true spirit and scope of the present disclosure.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A computer-implemented method of training a neural network for generating universal adversarial perturbations for processing captured images in an access control system, the method comprising:

collecting a plurality of data samples, wherein each data sample of the plurality of data samples is identified by a label from a finite set of labels; and training a probabilistic neural network for transforming the plurality of data samples into a corresponding plurality of perturbed data samples having a bounded probability of deviation from the plurality of data samples by maximizing a conditional entropy of the finite set of labels of the plurality of data samples conditioned on the plurality of perturbed data samples, wherein the conditional entropy is unknown, and the probabilistic neural network is trained based on an iterative estimation of a gradient of the unknown conditional entropy of the finite set of labels by minimizing a gradient-matching loss function that satisfies a fixed-point characterization derived for an optimal solution of the maximization of the conditional entropy, and wherein the fixed-point characterization is derived by converting an objective of the maximizing of the conditional entropy of the finite set of labels within the bounded probability of deviation to a corresponding Lagrangian form;

generating, using the trained probabilistic neural network, the universal adversarial perturbations;

applying the universal adversarial perturbations to the captured images of the access control system using the trained probabilistic neural network to generate perturbed captured images; and transmitting the perturbed captured images to using-a downstream machine-learning model of the access control system.

2. The method of claim 1, wherein the maximizing of the conditional entropy of the finite set of labels is represented as minimizing an unknown mutual information between the finite set of labels and a corresponding plurality of perturbed data samples for fixed entropies of the finite set of labels, and wherein the gradient of the unknown conditional entropy of the finite set of labels is estimated based on a mutual information gradient estimation method.

3. The method of claim 2, wherein a gradient of the unknown mutual information is decomposed as an entropy of the plurality of perturbed data samples without a conditional entropy of the plurality of perturbed data samples conditioned on the finite set of labels, wherein the conditional entropy of the plurality of perturbed data samples conditioned on the finite set of labels is decomposed as a summation of entropy of each perturbed data sample of the plurality of perturbed data samples conditioned on a corresponding label weighted by a probability of the corresponding label, and wherein a gradient of the entropy of the plurality of perturbed data samples and the entropy of each perturbed data sample conditioned on a corresponding label are estimated using a score function estimation method.

4. The method of claim 3, wherein the score function estimation method includes one or a combination of a Stein Gradient Estimator, a Spectral Stein Gradient Estimator, and a Kernel Exponential Family Estimator.

5. The method of claim 1, wherein the training of the probabilistic neural network is iterative until a termination condition is met, further comprising:

training the downstream machine-learning model with the plurality of perturbed data samples labeled with the finite set of labels of the corresponding plurality of data samples.

6. The method of claim 1, wherein the training of the probabilistic neural network is iterative until a termination condition is met, further comprising:

processing an input data with the probabilistic neural network to produce a perturbed input data; and classifying the perturbed input data using the downstream machine-learning model.

7. The method of claim 1, wherein the universal adversarial perturbations are multi-objective perturbations, the method further comprising:

selecting different bounds for bounding the probability of deviation of the plurality of perturbed data samples from the plurality of data samples based on an objective of the probabilistic neural network, the objective of the probabilistic neural network including a data-privacy objective and a robust learning objective, wherein a bound for the data-privacy objective is greater than a bound for the robust learning objective.

8. The method of claim 1, wherein the plurality of data samples corresponds to a sensed data signal measured by a sensor based on a type of relative placement between the sensor and a source of the sensed data signal, wherein the sensed data signal includes one or more of vital signs of a subject and wherein a corresponding label of the finite set of labels specifies the type of the relative placement.

9. A computer system for training a neural network for generating universal adversarial perturbations for processing captured images in an access control system, the computer system comprising: a processor; and a memory having instructions stored thereon, wherein the processor is configured to execute the stored instructions to cause the system to:

collect a plurality of data samples of a data signal, wherein each data sample of the plurality of data samples is identified by a label from a finite set of labels;

train a probabilistic neural network for transforming the plurality of data samples into a corresponding plurality of perturbed data samples having a bounded probability of deviation from the plurality of data samples by maximizing a conditional entropy of the finite set of labels of the plurality of data samples conditioned on the plurality of perturbed data samples, wherein the conditional entropy of the finite set of labels is unknown, and the probabilistic neural network is trained based on an iterative estimation of a gradient of the unknown conditional entropy of the finite set of labels by minimizing a gradient-matching loss function that satisfies a fixed-point characterization derived for an optimal solution of the maximization of the conditional entropy, and wherein the fixed-point characterization is derived by converting an objective of the maximizing of the conditional entropy of the finite set of labels within the bounded probability of deviation to a corresponding Lagrangian form;

generate, using the trained probabilistic neural network, the universal adversarial perturbations;

applying the universal adversarial perturbations to the captured images of the access control system using the trained probabilistic neural network to generate perturbed captured images; and transmit the perturbed captured images to a downstream machine-learning model of the access control system.

10. The system of claim 9, wherein for the maximizing of the conditional entropy, the processor is configured to execute the stored instructions to cause the system to:

represent the maximizing of the conditional entropy of the finite set of labels as minimizing an unknown mutual information between the finite set of labels and a corresponding plurality of perturbed data samples for fixed entropies of the finite set of labels, wherein the gradient of the unknown conditional entropy of the finite set of labels is estimated based on a gradient of the unknown mutual information.

11. The system of claim 10, wherein the processor is configured to execute the stored instructions to further cause the system to at least:

decompose a gradient of the unknown mutual information as an entropy of the plurality of perturbed data samples without a conditional entropy of the plurality of perturbed data samples conditioned on the finite set of labels; and decompose the conditional entropy of the plurality of perturbed data samples conditioned on the finite set of labels as a summation of entropy of each perturbed data sample of the plurality of perturbed data samples conditioned on a corresponding label weighted by a probability of the corresponding label, and wherein a gradient of the entropy of the plurality of perturbed data samples and the entropy of each perturbed data sample conditioned on a corresponding label are estimated using a score function estimation method.

12. The system of claim 9, wherein the training of the probabilistic neural network is iterated until a termination condition is met, and wherein the processor is configured to execute the stored instructions to further cause the system to at least:

train the downstream machine-learning model with the plurality of perturbed data samples labeled with the finite set of labels of the corresponding plurality of data samples.

13. The system of claim 9, wherein the training of the probabilistic neural network is iterative until a termination condition is met, and wherein the processor is configured to execute the stored instructions to further cause the system to at least:

process an input data with the probabilistic neural network to produce a perturbed input data; and classify the perturbed input data using the downstream machine-learning model.

14. The system of claim 9, wherein the universal adversarial perturbations are multi-objective perturbations, wherein the processor is configured to execute the stored instructions to further cause the system to at least:

select different bounds for bounding the probability of deviation of the plurality of perturbed data samples from the plurality of data samples based on an objective of the probabilistic neural network, the objective of the probabilistic neural network including a data-privacy objective and a robust learning objective, wherein a bound for the data-privacy objective is greater than a bound for the robust learning objective.

15. The system of claim 9, wherein the plurality of data samples corresponds to a sensed data signal measured by a sensor based on a type of relative placement in an arrangement between the sensor and a source of the sensed data signal, wherein a corresponding label of each data sample of the plurality of data samples specifies the type of the relative placement.

16. The system of claim 15, wherein the sensed data signal includes one or more of vital signs of a subject.

* * * * *